US012304822B2

(12) United States Patent
Arao et al.

(10) Patent No.: US 12,304,822 B2
(45) Date of Patent: May 20, 2025

(54) INORGANIC PARTICLE COMPOSITE, METHOD FOR PRODUCING THE SAME, AND INORGANIC PARTICLE COMPOSITE DISPERSION

(71) Applicants: TOKYO INSTITUTE OF TECHNOLOGY, Tokyo (JP); KYOCERA Corporation, Kyoto (JP)

(72) Inventors: Yoshihiko Arao, Tokyo (JP); Masatoshi Kubouchi, Tokyo (JP)

(73) Assignees: TOKYO INSTITUTE OF TECHNOLOGY, Tokyo (JP); KYOCERA Corporation, Kyoto (JP)

( * ) Notice: Subject to any disclaimer, the term of this patent is extended or adjusted under 35 U.S.C. 154(b) by 440 days.

(21) Appl. No.: 16/755,137

(22) PCT Filed: Oct. 12, 2018

(86) PCT No.: PCT/JP2018/038171
§ 371 (c)(1),
(2) Date: Apr. 9, 2020

(87) PCT Pub. No.: WO2019/074109
PCT Pub. Date: Apr. 18, 2019

(65) Prior Publication Data

US 2020/0331761 A1 Oct. 22, 2020

(30) Foreign Application Priority Data

Oct. 12, 2017 (JP) ................................ 2017-198450
Feb. 27, 2018 (JP) ................................ 2018-033385

(51) Int. Cl.
*C01B 32/225* (2017.01)
*C01B 21/064* (2006.01)
(Continued)

(52) U.S. Cl.
CPC ........ *C01B 32/225* (2017.08); *C01B 21/0648* (2013.01); *C01B 32/174* (2017.08);
(Continued)

(58) Field of Classification Search
CPC ... C01B 32/225; C01B 32/174; C01B 32/194; C01B 21/0648; C01B 21/064;
(Continued)

(56) References Cited

U.S. PATENT DOCUMENTS

2013/0102084 A1 4/2013 Loh et al.
2013/0108540 A1 5/2013 Baek et al.
(Continued)

FOREIGN PATENT DOCUMENTS

CN 103497735 A * 1/2014
CN 104709903 A 6/2015
(Continued)

OTHER PUBLICATIONS

Ab Rashid, TNI Tuan, et al. "Fabrication of calcium doped PISZT ceramics using high planetary mill method." Journal of Physics: Conference Series. vol. 1082. No. 1. IOP Publishing, 2018.*
(Continued)

*Primary Examiner* — Richard M Rump
(74) *Attorney, Agent, or Firm* — Volpe Koenig

(57) ABSTRACT

An inorganic particle composite excellent in dispersion stability in a polar solvent and a method for producing the same, and an inorganic particle composite dispersion are provided. A method for producing an inorganic particle composite according to the present disclosure includes (A) adding water-soluble salt to an inorganic powder and mixing the water soluble salt and the inorganic powder in a dry or paste form, and, (B) washing the mixture with water after (A) to obtain an inorganic particle composite including a component derived from the water-soluble salt. The water-
(Continued)

soluble salt has an acid dissociation constant pKa ($H_2Q$) of an acid of a counter anion of the water-soluble salt greater than 0.

11 Claims, 18 Drawing Sheets

(51) Int. Cl.
*C01B 32/174* (2017.01)
*C01B 32/194* (2017.01)
*C01G 39/06* (2006.01)

(52) U.S. Cl.
CPC ............ *C01B 32/194* (2017.08); *C01G 39/06* (2013.01); *C01P 2004/04* (2013.01); *C01P 2004/61* (2013.01); *C01P 2004/64* (2013.01)

(58) Field of Classification Search
CPC ......... C01B 32/19; C01B 39/00; C01G 39/06; C01G 39/00; C01P 2004/04; C01P 2004/61; C01P 2004/64
See application file for complete search history.

(56) References Cited

U.S. PATENT DOCUMENTS

| | | | |
|---|---|---|---|
| 2016/0090319 | A1 | 3/2016 | Hofmann et al. |
| 2017/0158512 | A1 | 6/2017 | Sohn et al. |

FOREIGN PATENT DOCUMENTS

| | | | | | |
|---|---|---|---|---|---|
| CN | 105836734 | A | | 8/2016 | |
| CN | 106477632 | A | | 3/2017 | |
| CN | 106830084 | A | | 6/2017 | |
| CN | 106865539 | A | * | 6/2017 | ............... C09C 1/46 |
| CN | 107200319 | A | | 9/2017 | |
| JP | 2011032156 | A | | 2/2011 | |
| JP | 2013536141 | A | | 9/2013 | |
| JP | 2015059079 | A | | 3/2015 | |
| JP | 2015168610 | A | | 9/2015 | |
| JP | 2016069275 | A | | 5/2016 | |
| JP | 2017500265 | A | | 1/2017 | |
| WO | 2013147087 | A1 | | 10/2013 | |
| WO | 2014175449 | A1 | | 10/2014 | |

OTHER PUBLICATIONS

Marimuthu, Mohana, et al. "Sodium functionalized graphene oxide coated titanium plates for improved corrosion resistance and cell viability." Applied surface science 293 (2014): 124-131.*

Wu, Yuping, and Tao Wang. "Hydrated salts/expanded graphite composite with high thermal conductivity as a shape-stabilized phase change material for thermal energy storage." Energy conversion and management 101 (2015): 164-171.*

Pentecost, A. et al., "Deaggregation of Nanodiamond Powders Using Salt- and Sugar-Assisted Milling," ACS Applied Materials & Interfaces, vol. 2, No. 11, Nov. 2, 2010, 6 pages.

Yamanaka, S. et al., "Production and Application of Crystalline Graphite Fine Particles with High Specific Surface Area Derived from Natural Graphite by Mechanical Grinding in Controlled Atmosphere," Journal of Smart Processing, vol. 1, No. 5, Jan. 2012, 5 pages. (Submitted with English Abstract).

Dong, Y. et al., "One-step and high yield simultaneous preparation of single- and multi-layer graphene quantum dots from CX-72 carbon black," Journal of Materials Chemistry, vol. 22, No. 18, Mar. 13, 2012, 3 pages.

Du, W. et al., "Organic salt-assisted liquid-phase exfoliation of graphite to produce high-quality graphene," Chemical Physics Letters, vol. 568-569, May 1, 2013, Available Online Mar. 29, 2013, 4 pages.

Posudievsky, O. et al., "High yield of graphene by dispersant-free liquid exfoliation of mechanochemically delaminated graphite," Journal of Nanoparticle Research, vol. 15, No. 11, Oct. 16, 2013, 9 pages.

Jeon, I. et al., "Scalable Production of Edge-Functionalized Graphene Nanoplatelets via Mechanochemical Ball-Milling," Advanced Functional Materials, vol. 25, No. 45, Oct. 23, 2015, 15 pages.

Matsumoto, K et al., "Dispersion of carbon nanotubes in organic solvents using inorganic salts," Proceedings of the 49th Fullerences-Nanotubes-Graphene General Symposium, Kitakyushu, Japan, Sep. 7, 2015, 4 pages.

Kim, J. et al., "Strength dependence of epoxy composites on the average filler size of non-oxidized graphene flake," Carbon, vol. 113, Mar. 2017, Available Online Nov. 12, 2016, 8 pages.

Japanese Patent Office, Office Action Issued in Application No. 2018-033385, Jul. 2, 2019, 15 pages. (Submitted with Machine Translation).

ISA Japanese Patent Office, International Search Report Issued in Application No. PCT/JP2018/038171, Jan. 8, 2019, WIPO, 2 pages.

Japanese Patent Office, Office Action Issued in Application No. 2017-198450, Aug. 17, 2021, 7 pages. (Submitted with Machine Translation).

* cited by examiner

COMPARATIVE EXAMPLE 2-3

EXAMPLE 2-3

INORGANIC PARTICLE COMPOSITE, METHOD FOR PRODUCING THE SAME, AND INORGANIC PARTICLE COMPOSITE DISPERSION

CROSS-REFERENCE TO RELATED APPLICATIONS

The present application is a U.S. National Phase of International Patent Application Serial No. PCT/JP2018/038171 entitled "INORGANIC PARTICLE COMPOSITE, METHOD FOR PRODUCING THE SAME, AND INORGANIC PARTICLE COMPOSITE DISPERSION," filed on Oct. 12, 2018. International Patent Application Serial No. PCT/JP2018/038171 claims priority to Japanese Patent Application No. 2017-198450 filed on Oct. 12, 2017 and Japanese Patent Application No. 2018-033385 filed on Feb. 27, 2018. The entire contents of each of the above-referenced applications are hereby incorporated by reference for all purposes.

TECHNICAL FIELD

The present disclosure relates to a method for exfoliating a layered mineral powder and a method for producing a layered nanoplate composite. Further, the present disclosure relates to an inorganic particle composite and a method for producing the same. Furthermore, the present disclosure relates to an inorganic particle composite dispersion using the inorganic particle composite.

BACKGROUND ART

Layered nanoplates represented by graphene are expected to be applied to functional materials and electronic materials such as functional adhesives, functional coating films, and functional printable inks with thermal conductivity and conductivity.

Non-Patent Literature 1 discloses a method for heavily oxidizing graphite with nitric acid, sulfuric acid, or the like to synthesize graphene oxide, and then performing hydrothermal synthesis, and cleaving an epoxy chain to make the graphene finer. Patent Literature 1 discloses a method for obtaining a graphene sheet organic dispersion using a graphene oxide aqueous dispersion containing a water-soluble compound having a 9,9-bis(substituted aryl) fluorene skeleton and graphene oxide, mixing the graphene sheet aqueous dispersion with an organic solvent, and then centrifuging and collecting the graphene sheet so as to obtain a graphene sheet organic dispersion. Patent Literature 2 discloses a method for adding graphite to a specific ionic liquid, and irradiating the mixture with microwaves or the like to produce a graphene dispersion.

Non-Patent Literature 2 discloses a method for adding salt to NMP, DMF, or DMSO, and then subjecting the mixture to high shear and ultrasonic treatment. Non-Patent Literature 3 discloses a method for inserting salt between graphite layers, and irradiating the intercalation compound with ultrasonic waves in pyridine to produce graphene. Patent Literature 3 proposes a method for immersing a carbon material having a graphene laminated structure in a liquid including an active methylene compound derivative and a basic compound and stirring the mixture to obtain a flaked graphite. Patent Literature 4 proposes a method for obtaining a flaked graphene using a dispersion in which graphite and a polyaromatic hydrocarbon compound are dispersed. Patent Literature 5 proposes a method for forming a graphene sheet from graphite using lithium borate, a lithium salt, and a solvent. Patent Literature 6 proposes a method for producing graphene or thin-film graphite through a step of immersing graphite crystals in a solvent including a permanganate. Patent Literature 7 proposes a fine carbon dispersion composition obtained using a dispersion for fine carbon including a polyimide precursor. Patent Literature 8 proposes a method for using an organic solvent and salt as a method for improving the dispersibility of carbon nanotubes, although the method is not about a layered mineral.

In addition to the above-described production methods using a liquid phase, a method for producing nanoparticles by dry milling has been proposed. As a method for accelerating the milling of natural graphite, it has been reported that a dry milling method in a vacuum environment or a nitrogen environment is effective (Non-Patent Literature 4). It has also been reported that graphite nanoplates having sulfur or hydrogen atoms bonded to edges can be obtained by dry-milling graphite in an environment including sulfur or an environment including hydrogen (Non-Patent Literature 5 and Patent Literature 9). Non-Patent Literature 6 reports a method for producing graphite nanosheets by adding NaCl during crushing. Non Patent Literature 7 reports that crushing nanodiamonds together with NaCl is effective in preventing aggregation of nanodiamonds.

CITATION LIST

Patent Literature

Patent Literature 1: Japanese Unexamined Patent Application Publication No. 2015-59079

Patent Literature 2: International Patent Publication No. WO 2014/175449

Patent Literature 3: Japanese Unexamined Patent Application Publication No. 2016-69275

Patent Literature 4: Published Japanese Translation of PCT International Publication for Patent Application, No. 2017-500265

Patent Literature 5: Published Japanese Translation of PCT International Publication for Patent Application, No. 2013-536141

Patent Literature 6: Japanese Unexamined Patent Application Publication No. 2011-32156

Patent Literature 7: International Patent Publication No. WO 2013/147087

Patent Literature 8: Japanese Unexamined Patent Application Publication No. 2015-168610

Patent Literature 9: US Patent Publication No. 2013/0108540

Non-Patent Literature

Non-Patent Literature 1: J. Mater. Chem. 2012, 22, 8764-8766.

Non-Patent Literature 2: Chemical Physics Letters 568-569 (2013) 198-201

Non-Patent Literature 3: Carbon 113 (2017) 379-386

Non-Patent Literature 4: Fujimoto T and Kuga Y, et al. Production and Application of Crystalline Graphite Fine Particles with High Specific Surface Area Derived from Natural Graphite by Mechanical Grinding in Controlled Atmosphere, Journal of Smart Processing, Vol. 1, 224-228, 2012.

Non-Patent Literature 5: Advanced Functional Materials. Vol. 25, 6961-6975, 2015.

Non-Patent Literature 6: Journal of Nanoparticle Research. Vol. 15, 2046, 2013.
Non-Patent Literature 7: ACS Applied Materials & Interfaces. Vol. 11, 3289-3294, 2010.

SUMMARY OF INVENTION

Technical Problem

A method for producing graphene with high dispersibility and higher productivity is desired in the market in order to realize application and development to various uses. Although the problems regarding graphene have been described above, the problems regarding layered nanoplates are similar in general.

Furthermore, a technique to prevent reaggregation of nanoparticles is important for industrial use, because nanoparticles have the property of easily aggregating. For example, when nanoparticles are used for a color material, aggregation of the nanoparticles causes degradation of image quality and poor leveling. A technique for preventing reaggregation of nanoparticles and enhancing dispersibility is desired, particularly in liquids.

A first object of the present disclosure relates to a method for exfoliating a layered mineral powder and a method for producing a layered nanoplate composite, specifically, a method for exfoliating a layered mineral powder and a method for producing a layered nanoplate composite which are excellent in productivity and dispersibility. A second object of the present disclosure is to provide an inorganic particle composite and a method for producing the same, and an inorganic particle composite dispersion, specifically, an inorganic particle composite excellent in dispersion stability in a polar solvent and a method for producing the same, and an inorganic particle composite dispersion.

Solution to Problem

As a result of intensive studies, the present inventors have arrived at the present disclosure based on the findings that the problem to be solved by the present disclosure can be solved in the following manner.

A method for producing an inorganic particle composite including:

adding water-soluble salt to an inorganic powder and mixing the water soluble salt and the inorganic powder in a dry or paste form; and washing the mixture with water after (A) to obtain an inorganic particle composite including a component derived from the water-soluble salt, wherein the water-soluble salt has an acid dissociation constant pKa ($H_2O$) of an acid of a counter anion of the water-soluble salt greater than 0.

The method according to [1], wherein the inorganic particle composite includes 1 to 100,000 ppm of a component derived from a counter cation of the water-soluble salt.

The method according to [1] or [2], wherein the inorganic powder is at least one of a layered mineral powder, an $sp^2$ type carbon material, a metal powder, a ceramic, and oxide powder of a layered mineral powder, an $sp^2$ type carbon material, a metal powder, or a ceramic.

The method according to any one of [1] to [3], wherein the counter cation of the water-soluble salt is any of potassium ion, sodium ion, lithium ion, barium ion, calcium ion, magnesium ion, rubidium ion, and ammonium ion.

The method according to any one of [1] to [4], wherein an average particle diameter of the inorganic particle composite when the inorganic particle composite is dispersed in a polar solvent is 1000 nm or less.

An inorganic particle composite obtained by adding water-soluble salt to an inorganic powder in a dry or paste form and then washing the mixture with water, wherein the water-soluble salt has an acid dissociation constant pKa ($H_2O$) of an acid of a counter anion of the water-soluble salt greater than 0, and the inorganic particle composite includes a component derived from the water-soluble salt.

The inorganic particle composite according to [6], wherein the inorganic particle composite includes 1 to 100,000 ppm of a component derived from a counter cation of the water-soluble salt.

The inorganic particle composite according to [6] or [7], wherein the inorganic powder is at least one of a layered mineral powder, an $sp^2$ type carbon material, a metal powder, a ceramic, and oxide powder of a layered mineral powder, an $sp^2$ type carbon material, a metal powder, or a ceramic.

The inorganic particle composite according to any one of [6] to [8], wherein the counter cation of the water-soluble salt is any of a potassium ion, a sodium ion, a lithium ion, a barium ion, a calcium ion, a magnesium ion, a rubidium ion, and an ammonium ion.

The inorganic particle composite according to any one of [6] to [9], wherein an average particle diameter when the inorganic particle composite is dispersed in a polar solvent is 1000 nm or less.

An inorganic particle composite dispersion comprising the inorganic particle composite according to any one of [6] to [10] dispersed in a solvent.

Advantageous Effects of Invention

The present disclosure exerts an excellent effect of providing a method for exfoliating a layered mineral powder and a method for producing a layered nanoplate composite which are excellent in productivity and dispersibility. The present disclosure exerts another excellent effect of providing an inorganic particle composite excellent in dispersion stability in a polar solvent and a method for producing the same, and an inorganic particle composite dispersion.

DESCRIPTION OF EMBODIMENTS

Figure 1:
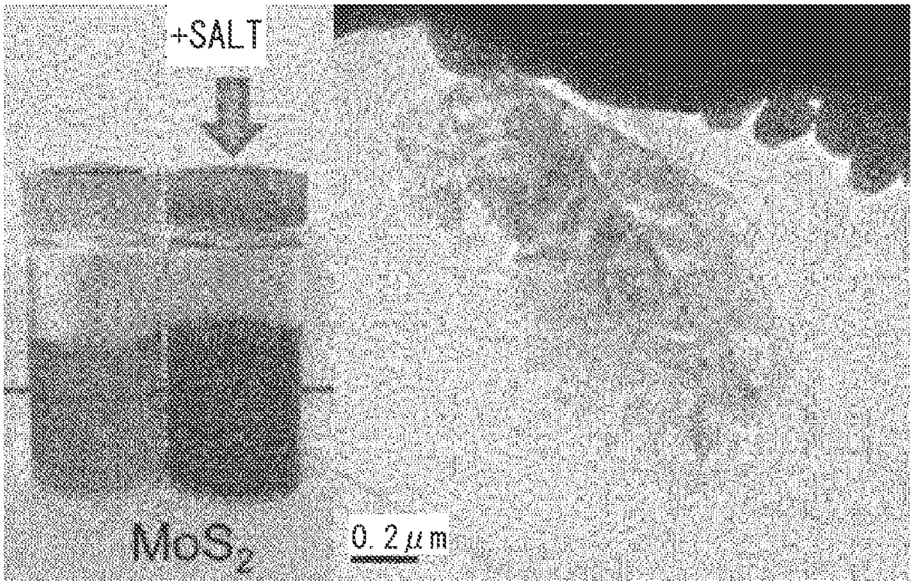
FIG. 1 is a TEM image of a dispersion according to Example 1-1 (the left side of the drawing shows a sample bottle before salt is added, and the right side of the drawing shows a sample bottle after salt is added) and a layered nanoplate composite according to Example 1-1.

Hereinafter, an example of embodiments to which the present disclosure is applied will be described. Other embodiments are also included in the scope of the present disclosure as long as they conform to the gist of the present disclosure, as a matter of course.

First Embodiment

Method for Exfoliating Layered Mineral Powder

A method for exfoliating a layered mineral powder according to a first embodiment relates to a method for exfoliating a layered mineral powder to make it thinner than an original layered mineral powder. The method for exfoliating a layered mineral powder according to the first embodiment includes an adding step of adding at least a layered mineral powder and salt soluble in an organic solvent to the organic solvent, and a mixing step of mixing the salt and the layered mineral powder in the organic solvent. Here, the "salt dispersed in an organic solvent" means that the salt is substantially suspended without dissolving. However, the suspension only needs to be dominant, and some salts may be dissolved in the organic solvent. Note that the dispersion only requires each of the salt and layered mineral powder to be dissolved in the organic solvent and includes dispersion using physical means such as stirring. The adding step and the mixing step may be performed simultaneously or sequentially. Further, the order of addition of the salt and the layered mineral powder in the adding step is not specifically defined.

Layered Mineral Powder

The layered mineral powder according to the first embodiment refers to a powdered layered mineral that laminated in layers. The size of the "layered mineral powder" used as a starting material is not particularly limited and may be any size as long as it can be dispersed in an organic solvent. For example, a millimeter-order granular powder, micro-sized or nano-sized fine particles may be used.

The type of the layered mineral powder is not particularly limited, and examples thereof include boron nitride, molybdenum disulfide, natural graphite, artificial graphite, expanded graphite, amorphous graphite, plate-like graphite, graphene nanoplate, graphene, tungsten disulfide, graphene oxide, titanium oxide, manganese oxide, vanadium oxide, layered double hydroxide (LDH), transition metal dichalcogenite, and black phosphorus. Graphene includes multilayer graphene and single-layer graphene. The layered mineral powder can be produced by a known method, or a commercially available product may be used. The layered mineral powder is used alone or in combination. The amount of the layered mineral powder added to the organic solvent is not particularly limited as long as it does not interfere with the dispersion, but is preferably 10 to 100 g/L.

Organic Solvent

As the organic solvent according to the first embodiment, a solvent having a relative permittivity satisfying the following Formula (1) is used.

$$4 \leq \text{volume ratio of organic solvent } 1 \times \text{relative permittivity of organic solvent } 1 + \ldots + \text{volume ratio of organic solvent } n-1 \times \text{relative permittivity of organic solvent } n-1 \leq 60 \quad \text{Formula (1)}$$

In this formula, n is an integer of 1 or more, n=1 represents a single solvent, and n≥2 represents a mixed solvent.

The type of the organic solvent may be a single organic solvent or a mixed solvent of two or more types of organic solvents. When one type of an organic solvent is used, an organic solvent having a relative permittivity of 4 or more and 60 or less is used. When a plurality of organic solvents are mixed, as shown in the above Formula (1), organic solvents in which a sum of a product of a volume ratio of each organic solvent to all organic solvents and a relative permittivity of each organic solvent is 4 or more and 60 or less are used. In terms of improving the dispersibility, the more preferable range of Formula (1) is 10 or more and 50 or less, and the further preferable range of Formula (1) is 20 or more and 40 or less.

Further, as the organic solvent according to the first embodiment, a solvent having a boiling point satisfying the following Formula (2) is used.

$$\text{Volume ratio of organic solvent } 1 \times \text{boiling point of organic solvent } 1 + \ldots + \text{volume ratio of organic solvent } n-1 \times \text{boiling point of organic solvent } n-1 < 100^\circ \text{ C.} \quad \text{Formula (2)}$$

In this formula, n is an integer of 1 or more, n=1 represents a single solvent, and n≥2 represents a mixed solvent.

When one type of an organic solvent is used, an organic solvent having a boiling point of less than 100° C. is used. When a mixed organic solvent is used, as shown in the above Formula (2), organic solvents in which a sum of a product of a volume ratio of each organic solvent to all organic solvents and a boiling point of each organic solvent is less than 100° C. are used. In terms of the use of the dispersion, the more preferable range of Formula (2) is 90° C. or lower, and the further preferable range Formula (2) is 80° C. or lower. Although there is no lower limit for the boiling point in particular, an organic solvent which can be easily produced at room temperature and which is a liquid at room temperature (23° C.) is preferable in terms of easy handling, and an organic solvent having a boiling point of 60° C. or higher is more preferable.

When a relative permittivity of an organic solvent satisfies the above Formula (1), dissociation of salt can be induced in an organic solvent. The dissociation of salt may be partially occurred, and the degree of the dissociation is not limited, but it is not preferable that all the salt is dissociated. In other words, a state in which salt is partially dissociated or hardly dissociated in an organic solvent is preferable.

The type of the organic solvent is not particularly limited as long as it satisfies the above Formulas (1) and (2). Preferable examples of the solvent when used alone include acetone, ethanol, methanol, 2-propanol, tetrahydrofuran, methyl ethyl ketone, and acetonitrile. In the case of a mixed solvent, in addition to the organic solvent, an organic solvent that does not satisfy the above Formulas (1) and/or (2) by itself may be used in combination with another organic solvent. Examples of the organic solvent used for such mixing include dimethylformamide, dimethylsulfoxide, N-methylpyrrolidone (NMP), toluene, and xylene. In terms of the post-processability of the dispersion, polar solvents such as acetone, ethanol, and methanol are preferable. In terms of the production stability, it is preferable to use one type of organic solvent.

Salt

The salt according to the first embodiment functions as an exfoliation agent for exfoliating a layered mineral powder in the organic solvent. As the salt according to the first embodiment, salt having an acid dissociation constant pKa ($H_2O$) of an acid of a counter anion constituting the salt greater than 0 is used. The acid of the counter anion of the preferable salt includes phosphoric acid (1.83), acetic acid (4.76), and carbonic acid (6.11).

Preferable examples of the counter cation forming salt with the anion include potassium ion, sodium ion, and ammonium ion. The concentration of the salt is not particularly limited, but is preferably, for example, 0.01 to 100 parts by mass, and more preferably, 0.1 to 10 parts by mass, and furthermore preferably 0.1 to 1 parts by mass per 100 parts by mass of the layered mineral powder. The amount of salt added to the organic solvent is not particularly limited, but is preferably 0.05 to 10 g/L.

The environmental conditions when the adding step of adding the salt and the layered mineral powder to the organic solvent are not particularly limited, but the adding step can be simply performed at room temperature in air. The order of addition is not limited. The salt and the layered mineral powder may be added at the same time or the salt may be added to the dispersion of the layered mineral powder. In the subsequent mixing step, known mixing means may be used without limitation. For example, a mixer such as a stirrer may be used. Examples of the known mixing means include ultrasonic irradiation, microwave irradiation, a high speed homogenizer, a pressure homogenizer, jet milling, ball milling, and bead milling. In the mixing step, a heating step may be used in combination.

After the mixing step, a filtration step may be performed, as necessary. As a filter used for the filtering, a Teflon (registered trademark) membrane or the like is preferably used. An optimum hole diameter is selected according to the application. Commonly, washing is carried out using a good solvent after the filtration step. Impurities such as salt are removed through these steps.

After performing the filtration step (filtering out step) or without performing the filtration step (filtering out step), the product can be redispersed in the organic solvent according to the first embodiment, and a size fractionation step can be performed. Examples of the size fractionation method include centrifugation, dialysis, filtration (ultrafiltration, pressure filtration, vacuum filtration, etc.), and ultracentrifugation.

The layered mineral powder is exfoliated through these steps. As a method for accelerating the exfoliation, it is effective to increase the salt concentration, increase the time for the mixing treatment, or define severe stirring conditions. The mechanism by which the layered mineral powder is exfoliated is that a part of the salt is dissociated by bringing the layered mineral powder into contact with the salt in the above-mentioned specific organic solvent, and the layered mineral powder and the counter cation of the salt are mutually bonded or coordinated. It is considered that this bonding or coordination causes electrostatic repulsion to be induced in the layered mineral powder, thereby making the layered mineral powder exfoliate. It is considered that the bonding or coordination between the layered mineral powder and the counter cation of the salt is mainly formed at the edge of the layered mineral powder. It is thus considered that the layered mineral powder obtained through these steps has the counter cation of the salt bound or coordinated mainly at the edge.

The method for exfoliating a layered mineral powder according to the first embodiment is carried out by a simple step of adding salt and a starting material layered mineral powder to a specific organic solvent, and then mixing them, and thus the productivity can be significantly enhanced. The exfoliated layered mineral powder is thinner than the starting material layered mineral powder, and it is considered that a counter cation of the salt is bonded or coordinated to the edge of the layered mineral powder. The obtained dispersion may be used as it is or after it is purified. Further, a resin or the like may be added to the dispersion to be used, for example, as a paste material. The obtained dispersion may also be used as a composition such as ink. Furthermore, unnecessary substances such as salt are removed from the dispersion, and the organic solvent is distilled off to be used as a powder. Examples of drying step when the organic solvent is distilled off include heating drying, vacuum drying, and a combination thereof.

A layered nanoplate composite may be used as a dispersion and in addition, it may be formed into, for example, paste, powder, or sheet. Further, cationic components may be removed from the layered nanoplate composite. When cationic components are removed from the layered nanoplate composite, a layered nanoplate composite with bound ammonium ions is preferable, because an ammonium component can be easily removed by heating. The content ratio of the resin and the layered nanoplate composite may be appropriately designed according to the needs. The content of the layered nanoplate composite as compared with that of the resin is, for example, 0.1 to 95 mass %. The layered nanoplate composite may be applied to a substrate to form a coating film.

When the layered nanoplate composite is used as a composition, other compounds may be added after the salt is removed as necessary. Other compounds may be selected as appropriate according to the purpose and needs. Preferable examples of the other compounds include resins, dispersants, defoamers, plasticizers, antioxidants, colorants, and binder materials. Examples of the resin include a thermoplastic resin, and a thermosetting resin including a curable compound. A photosensitive resin and a conductive resin are also preferably used. Examples of the thermoplastic resin include a (meta) acryl-based polymer, a polyolefin resin, a polyamide resin, polystyrene, polycarbonate, polyethylene terephthalate, a phenoxy resin, and a photosensitive resin. In order to improve impact resistance, the thermoplastic resin composition may contain other elastomer components. Further, a conductive polymer may be used as the resin, so that a conductive characteristic can be manifested by a synergistic effect of graphene and/or graphite and the conductive polymer. The content ratio of the resin and the layered nanoplate composite may be appropriately designed according to the needs. The content of the layered nanoplate composite as compared with that of the resin is, for example, 0.1 to 95 mass %.

The methods of Non-Patent Literature 1 and Patent Literature include a step for oxidation/reduction reaction, which is not considered to be highly productive. Further, the methods of Patent Literature 2 to 4 requires preparation of a specific ionic liquid, an active methylene compound derivative, a polyaromatic hydrocarbon compound, or the like, which is not considered to be highly productive. Furthermore, the method of Non-Patent Literature 2 has a problem in post-processability of the dispersion in, for example, a drying step when a sheet is formed, because NMP, DMF, or DMSO is used.

On the other hand, with the method for exfoliating a layered mineral powder according to the first embodiment, the layered mineral powder can be exfoliated simply and in a short time by using an organic solvent that satisfies Formulas (1) and (2), and using salt formed by using an acid having an acid dissociation constant pKa ($H_2O$) exceeding 0. Further, the production step is simple and the productivity can be improved in the method for exfoliating a layered mineral powder according to the first embodiment, because commercially available salt can be used. This is considered to be because the dispersibility in the organic solvent is remarkably enhanced by mutual electrostatic repulsion of the layered nanoplate composite in which the counter anion of the salt is bonded or coordinated. The temporal stability of the obtained layered nanoplate composite can also be improved.

Furthermore, the presence or absence of external energy and the strength thereof can be easily adjusted in the mixing step, and the size fractionation by re-separation after centrifugation is also easy. With the method for exfoliating a layered mineral powder according to the first embodiment, the production cost can be reduced. Further, the method for exfoliating a layered mineral powder according to the first embodiment has an advantage that a surface area can be increased more than a surface area of the starting material layered mineral powder by the exfoliation. In association with this, it is expected that the properties (e.g., conductivity) of the layered mineral powder will be improved.

Method for Producing Layered Nanoplate Composite

Next, a method for producing a layered nanoplate composite according to the first embodiment will be described. The method for producing a layered nanoplate composite includes, in addition to the mode of exfoliating a layered mineral powder (which is the overlape as above-described method for exfoliating a layered mineral powder), a mode of not exfoliating a layered mineral powder (which is a layered nanoplate composite in this case) but remarkably improving dispersion, and a combination thereof. Further, the method for exfoliating a layered mineral powder differs from the method for producing a layered nanoplate composite in that a compound obtained in the method for exfoliating a layered mineral powder is not limited to the nano-order (0.3 nm or more and less than 1000 nm), and that the method for producing a layered nanoplate composite includes a mode of not exfoliating a layered mineral powder but causing dispersion of the layered mineral powder. An object of the method for exfoliating a layered mineral powder may differ from or may be the same as an object of the method for producing a layered nanoplate composite. Thus, the method for producing a layered nanoplate composite has basically the same steps as those according to the above embodiment.

The method for producing a layered nanoplate composite according to the first embodiment includes a step of adding a layered mineral powder and salt dispersed in an organic solvent to an organic solvent satisfying the above-described Formulas (1) and (2), and a mixing step of stirring the obtained mixed liquid. As described above, the salt has an acid dissociation constant pKa ($H_2O$) of an acid of a counter anion of the salt of greater than 0. The adding step and the mixing step may be performed simultaneously or sequentially.

Layered Nanoplate Composite

The layered nanoplate composite according to the first embodiment is a composite in which a layered mineral powder obtained by adding an original layered mineral powder together with salt in an organic solvent and mixing them is bonded or coordinated with a counter cation of the salt. The thickness of a layered nanoplate composite is in the nanometer order of 0.3 nm or more and less than 1000 nm, and includes a single layer or a laminate. Depending on the application, the thickness of the layered nanoplate is more preferably less than 100 nm. With the method for producing a layered nanoplate composite according to the first embodiment, it is possible to provide a dispersion having remarkably excellent dispersibility. The method for producing a layered nanoplate composite according to the first embodiment also has an excellent effect of high productivity, because a layered nanoplate composite can be prepared at room temperature and in a short time. Note that the layered nanoplate composite may be made thinner than or the same size as that of the layered mineral powder used as the starting material.

Layered Mineral Powder

The layered mineral powder used in the method for producing a layered nanoplate composite is powdery layered mineral that is laminated in layers as described above. The size of the "layered mineral powder" used as the starting material is not particularly limited as long as a layered nanoplate composite is obtained. Examples of the layered mineral powder include a granular powder in the order of millimeters, and micro-sized or nano-sized fine particles. Examples of the types of the layered mineral powder include graphene quantum dots in addition to the above described powder.

For example, graphene may be used as the layered mineral powder to obtain a graphene nanoplate composite having a single layer or a small number of layers, or a highly dispersed dispersion may be obtained using a single layer of graphene or graphene quantum dots as the layered mineral powder. One or more kinds of the layered mineral powder may be used.

Organic Solvent

As the organic solvent according to the first embodiment, a solvent having a relative permittivity satisfying the above Formulas (1) and (2) is used. The preferable range and the type of the organic solvent are as described above.

Salt

The salt according to the first embodiment plays a role of dispersing a layered mineral powder in an organic solvent. The salt according to the first embodiment can also have a role of exfoliating a layered mineral powder. As described above, the salt according to the first embodiment uses salt in which an acid dissociation constant pKa ($H_2O$) of the acid of the counter anion constituting the salt is greater than 0. The acid of counter anion of the preferable salt, preferable the counter cation, and preferable concentrations and the like are as described above.

The environmental conditions at the time of performing the adding step of adding salt and a layered mineral powder to an organic solvent are not particularly limited, and examples thereof include the same examples as those of the above-described method for exfoliating a layered mineral powder. The filtration, washing, size fractionating steps, and the like, which are performed as necessary after the mixing step, are also as described above.

A layered nanoplate composite is produced through these steps. As a method for further improving the dispersibility, there is a method for adjusting the salt concentration and the mixing treatment conditions. With the method for producing a layered nanoplate composite according to the first embodiment, the productivity can be remarkably enhanced, because the method for producing a layered nanoplate composite according to the first embodiment has simple steps of adding salt and a starting material layered mineral powder to a specific organic solvent and then performing a mixing step.

The method for producing a layered nanoplate composite according to the first embodiment can provide a dispersion that remarkably enhances the dispersibility of the layered mineral powder and that is excellent in temporal stability. Further, the dispersibility of the layered nanoplate composite in a solvent or a slurry can be improved by binding or coordinating the counter cation to the layered nanoplate composite.

Second Embodiment

In the first embodiment, an example of the method for exfoliating a layered mineral powder and a method for producing a layered nanoplate composite have been described. In a second embodiment, an example of an inorganic particle composite and a method for producing the same, and an inorganic particle composite dispersion will be described.

Inorganic Particle Composite

An inorganic particle composite according to the second embodiment is a particle obtained by adding water-soluble salt to an inorganic powder, mixing the mixture in a dry or paste form, and then washing it with water, and is a composite including a component of the inorganic powder and a minute amount of the water-soluble salt. The excess water-soluble salt used in the production step is removed by washing with water.

The inorganic powder used in the second embodiment is not limited in particular as long as it falls within the scope not departing from the spirit of this embodiment. Examples of the inorganic powder include a layered mineral powder, an $sp^2$ type carbon material, a metal powder, ceramics, and an oxide powder thereof.

Preferable examples of the inorganic powder include boron nitride, molybdenum disulfide, natural graphite, artificial graphite, expanded graphite, amorphous graphite, plate-like graphite, graphene nanoplate, graphene, tungsten disulfide, graphene oxide, graphene oxide, titanium oxide, manganese oxide, vanadium oxide, layered double hydroxide (LDH), transition metal dichalcogenite, black phosphorus, carbon nanotube, fullerene, carbon black, boron nitride, molybdenum disulfide, tungsten disulfide, titanium oxide, graphene oxide, vanadium oxide, silica, alumina, silver nanoparticles, silver nanowires, layered double hydroxide (LDH), and transition metal dichalcogenite. The graphene includes multilayer graphene, single-layer graphene, and graphene quantum dots. As the inorganic powder, a commercially available product may be used as it is or may be used after subjecting it to a crushing treatment. Alternatively, the inorganic powder may be produced from a mineral or the like by a well-known method. The inorganic powder may be used alone or in combination of two or more types of inorganic powders. The size of the "inorganic powder" used as a starting material is not particularly limited. For example, the inorganic powder is a granular powder in the order of millimeters or micro-sized or nano-sized fine particles, etc.

As the water-soluble salt according to the second embodiment, salt that is soluble in water and has an acid dissociation constant pKa ($H_2O$) of an acid of a counter anion greater than 0 is used. The water-soluble salt functions as a milling aid for the inorganic powder and plays a role as a trace component for forming a Stern layer of the inorganic particle composite, as will be described later.

Example of a preferable acid of the counter anion of the preferable water-soluble salt include phosphoric acid (1.83), acetic acid (4.76), carbonic acid (6.11), glutamic acid, and tartaric acid. The counter cation forming the water-soluble salt with the anion is preferably a cation having a high ionization tendency. Preferable examples of the counter include potassium ion, sodium ion, lithium ion, ammonium ion, barium ion, calcium ion, magnesium ion, and rubidium ion.

Specific examples of the water-soluble salts include sodium glutamate, sodium acetate, sodium tartrate, trisodium phosphate, and sodium carbonate. Further examples of the water-soluble salts include salts in which sodium of these water-soluble salts is changed to potassium, lithium, barium, calcium, magnesium, rubidium, and ammonium, etc., respectively.

The dried inorganic particle composite may be any of primary particles, secondary particles, aggregates, and mixtures of any combination thereof. The average particle diameter of the inorganic particle composite is not limited. An average particle diameter in the case where the inorganic particle composite is dispersed in a polar solvent may be appropriately designed according to the application, but it is preferably 1000 nm or less in terms of further enhancing the dispersibility.

The inorganic particle composite according to the second embodiment can remarkably enhance the dispersibility in a polar solvent. The possible reasons for that are described below. In the process for producing an inorganic particle composite, a radical is generated on the surface of an inorganic powder when the inorganic powder and water-soluble salt are mixed, and the radical reacts with a counter anion of the water-soluble salt which is weak acid salt. Then, a component of the water-soluble salt is bonded to a part of the surface of the inorganic powder. The places where radicals are likely to be generated vary depending on the type of the inorganic powder. In the case of a layered powder, radicals are most likely to be generated at edges of the surface. The inorganic particle composite including the component of the water-soluble salt is obtained by removing the excess water-soluble salt by washing with water.

Figure 6:
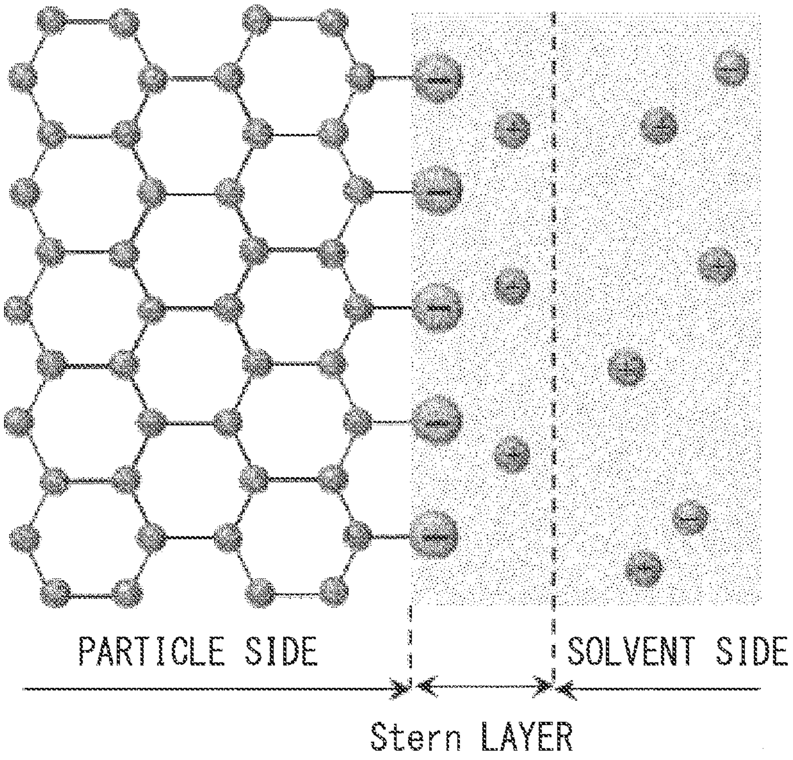
FIG. 6 is a schematic explanatory view of a Stern layer on a surface of an inorganic particle composite.

When the inorganic particle composite obtained through these steps is dispersed in a polar solvent, the water-soluble salt is ionized, and anions and cations are separated as shown in FIG. 6. At this time, the anion side is bonded to the inorganic particles, and the inorganic particle composite is negatively charged. On the other hand, the cations in the water-soluble salt is attracted around negatively charged particles. This forms a Stern layer, which is an electric double layer of the cations and anions. The neutralization of the charge by the cations on the particle surface is imperfect due to the thermal motion, and an electric field leakage from the shielding caused by this is considered to generate a repulsive force between particles. The larger the absolute value of the zeta potential, which is an index of the magnitude of the repulsive force, the greater the repulsive force between the inorganic particle composites and the more stable the dispersibility become. Commonly, when the zeta-potential exceeds 30 eV, the dispersibility becomes favorable.

Since the inorganic particle composite includes a component derived from the counter cation of the water-soluble salt, the dispersibility in the polar solvent can be remarkably enhanced. The content rate of the component derived from the counter cation of the water-soluble salt is preferably within the range of 1 to 100,000 ppm in terms of further improving dispersibility, more preferably within the range of 35 to 10,000 ppm, and even more preferably 100 to 5,000 ppm. The concentration of cations derived from salts such as potassium, sodium, and lithium of the obtained inorganic particle composite can be measured with an electron beam micro analyzer (EPMA). When EPMA cannot detect the cation concentration, an ICP mass spectrometry can detect the cation concentration with an accuracy of 1 ppm. The presence of ammonium can be detected by a Nessler's reagent.

In the present specification, the polar solvent refers to water or a solvent having a relative permittivity satisfying the following Formula (3).

$$4 \leq \text{volume ratio of solvent } 1 \times \text{relative permittivity of solvent } 1 + \ldots + \text{volume ratio of solvent } n-1 \times \text{relative permittivity of solvent } n-1 \qquad \text{Formula (3)}$$

In this formula, n is an integer of 1 or more, n=1 represents a single solvent, and n≥2 represents a mixed solvent.

In terms of improving the dispersibility, the more preferable range of Formula (3) is 10 or more, and the more preferable range of Formula (3) is 20 or more. When the relative permittivity is high, a further effect of electrostatic repulsion can be expected, so that an upper limit value of Formula (3) is not limited. The solvent may be used alone or in combination of two or more types of solvents. When a mixed solvent is used, a mixture that is compatible with each other is used. Note that the inorganic particle composite according to the second embodiment is not necessarily dispersed in a polar solvent, but may be used as a powder or dispersed in a solvent other than a polar solvent (e.g., nonpolar solvent), as a matter of course.

Examples of preferable polar solvents include water, acetone, ethanol, methanol, 2-propanol, tetrahydrofuran, methyl ethyl ketone, acetonitrile, dimethylformamide, dimethyl sulfoxide, N-methylpyrrolidone (NMP), and combinations of these solvents.

Method for Producing Inorganic Particle Composite

A method for producing an inorganic particle composite according to the second embodiment includes a step (A) of adding water-soluble salt to an inorganic powder and mixing the water-soluble salt and the inorganic powder in a dry or paste form, and a step (B) of washing the mixture with water after the step (A) to obtain an inorganic particle composite including a component of the water-soluble salt. The water-soluble salt to be used is as described above. Here, the paste form ((paste-like state) refers to all states in which the state is not classified as a liquid, has a high viscosity, and is confirmed to be fluid. The viscosity range is about 0.01 to 500 Pa·s at a shear rate of 1 $s^{-1}$ at 20° C.

In the step (A), a part of the component of the water-soluble salt is bonded to the inorganic powder and incorporated into the inorganic powder to promote exfoliation and milling of the inorganic powder. In the present specification, "milling" is not limited to crushing and disintegrating by downsizing the inorganic powder used as the starting material, but also includes milling for the purpose of simply disassembling the aggregation of the inorganic powder used as the starting material. The dry (state) includes a mode in which a solvent is added as a lubricant, although the dry (state) is not included in the above-described definition of the paste form.

The concentration of the water-soluble salt is not particularly limited. The modification of the inorganic powder by the water-soluble salt is efficiently promoted, because the frequency of contact between the inorganic powder and the water-soluble salt is increased by increasing the addition amount of the water-soluble salt when the inorganic powder is mixed in a dry state or a paste state. Thus, the amount of the water-soluble salt to be added may be appropriately set according to the required dispersibility and application. For example, the amount of the water-soluble salt to be added is preferably 0.01 to 100 parts by mass per 1 part by mass of the inorganic powder. The amount of the water-soluble salt to be added is more preferably 0.1 to 10 parts by mass, and in terms of enhancing the graphite yield, the amount of salt added to graphite is preferably within the range of 0.2 to 5 parts by mass, and more preferably within the range of 0.1 to 1 parts by mass.

Although the environmental conditions for mixing the water-soluble salt and the inorganic powder and milling them are not particularly limited, the mixing and milling can be easily performed at room temperature in air. The mixing and milling may be performed in a nitrogen atmosphere or in an inert gas environment such as argon. Further, the temperature may be set to a high temperature or a low temperature as necessary. The mixing and milling may also be performed in a pressurized environment or a decompressed environment.

Any known apparatus may be used for a milling device without limitation. Examples of the milling device include dry milling equipment such as a bead milling device, a jet milling device, a hammer milling device, and a high-speed mixer. The treatment conditions and the like may be appropriately adjusted according to the type of the inorganic powder, the size of the required particle size, etc. In the mixing step, the inorganic powder can be milled by utilizing the hardness of the inorganic powder or the water-soluble salt. By optimizing the conditions of the mixing step, it is also possible to obtain an inorganic particle composite having a very fine primary particle diameter and a sharp particle size distribution with a narrow distribution width when the inorganic particle composite is dispersed in a polar solvent. Appropriate conditions for the mixing step may be determined according to the starting material used and the particle size of the desired inorganic particle composite.

After the mixing step, the excess water-soluble salt is removed by washing with water in the step (B). The amount of water added during the washing is not particularly limited as long as it is sufficient to obtain a suspension. The water may be heated as necessary. For example, water having a mass of 10 to 10,000 times the mass is added and stirred. The excess water-soluble salt can be easily removed together with the water. The washing conditions may be appropriately set according to the type of the inorganic powder or water-soluble salt used. The inorganic particle composite including the component of the water-soluble salt is obtained by washing with water. A step of removing coarse particles or a size fractionation step may be added before or simultaneously with the step (B). The dispersibility in the polar solvent can be remarkably enhanced by the inorganic particle composite including the component of the water-soluble salt.

After washing with water, a filter (e.g., a Teflon (registered trademark) membrane filter) may be used. In this case, an optimum hole diameter is selected according to the application. The obtained inorganic particle composite may be dried and then taken out as a powder, may be dispersed in a liquid, or may be used as a paste. The drying step may be performed by any method. For example, the inorganic particle composite may be dried by a spray drying method.

Examples of the method for size fractionation include centrifugation, dialysis, filtration (ultrafiltration, pressurized filtration, vacuum filtration, etc.), and ultracentrifugation. An inorganic particle composite including 1 to 100,000 ppm of an element or ammonium derived from a counter cation forming water-soluble salt is obtained in the inorganic particle composite through these steps.

Radicals are generated on the surface of the inorganic powder by physical contact and friction during the mixing step, and are mutually bonded to the counter anion of the water-soluble salt. It is considered that the milling of the inorganic powder is promoted by preventing the reaggregation of the inorganic powder by the radicals. The bond between the inorganic powder and the counter anion of the water-soluble salt is considered to be formed mainly on the surface of the inorganic powder such as the edge thereof.

The anion-derived component of the water-soluble salt in the inorganic particle composite is considered to be incorporated into the inorganic powder by chemical bonding on the surface of the inorganic powder such as the edge thereof. More specifically, it is considered that in the mixing step of the inorganic powder and the water-soluble salt, the anion-derived component of the water-soluble salt in the inorganic particle composite is the counter anion of the water-soluble salt bonded to the inorganic powder by a weak acid releasing reaction between radicals generated on a fracture surface of the inorganic powder and a weak acid. The bond may be any of a covalent bond, an ionic bond, or a coordination bond. When the component of the water-soluble salt is physically adsorbed to the inorganic powder instead of such bonding, the dispersibility of the obtained inorganic particle composite is inhibited when the inorganic particle composite is added to the polar solvent.

The method for producing an inorganic powder according to the second embodiment is carried out by a simple step of adding water-soluble salt and a starting material inorganic powder, and then mixing them, and thus the productivity can be significantly enhanced. Further, the production cost can be reduced, because commercially available water-soluble salt can be used. Furthermore, excellent dispersion stability and temporal stability of the obtained inorganic particle composite can be achieved. Moreover, there is an advantage that the surface area can be increased as compared with the starting material inorganic powder by the milling.

Inorganic Particle Composite Dispersion

The inorganic particle composite dispersion according to the second embodiment refers to a dispersion obtained by dispersing the inorganic particle composite in a solvent. The inorganic particle composite dispersion may further include other components in addition to a dispersion in which only the inorganic particle composite is dispersed in a solvent. The solvent is preferably a polar solvent in terms of remarkably improving dispersibility. When the inorganic particle composite is dispersed in a polar solvent, the dispersibility is remarkably enhanced by the electrostatic repulsion caused by the Stern layer of the inorganic particle composite.

Aggregates may be formed in the dried inorganic particle composite obtained through the steps (A) and (B). However, even in such a case, the inorganic particle composite can be disintegrated in a polar solvent by being dispersed in the polar solvent, thereby enhancing dispersibility.

It has been desired to improve dispersibility of particles having an average particle diameter of 1000 nm or less, which tend to aggregate. With the inorganic particle composite according to the second embodiment, the dispersibility can be remarkably enhanced by dispersing the inorganic particle composite in a polar solvent. Thus, the inorganic particle composite according to the second embodiment is particularly preferable when the average particle diameter of the inorganic particle composite in a polar solvent is 1000 nm or less. The inorganic particle composite according to the second embodiment does not exclude the inorganic particle composite having an average particle diameter of more than 1000 nm in a polar solvent, as a matter of course. The average particle diameter of the inorganic particle composite in the polar solvent can be easily adjusted by adjusting the mixing treatment conditions of the mixing step (A), removing coarse particles, performing the size fractionation step, and the like.

The method for obtaining a dispersion may be carried out by adding a dispersion solvent, and mixing and stirring it. At this time, other additives such as a binder resin, a pigment, a pigment, and a surfactant may be added.

When another compound is added as a composition, the compound to be added may be appropriately selected according to the purpose and needs. Resins, dispersants, defoamers, plasticizers, antioxidants, colorants, binders, and the like may be added. Examples of the resin include a thermoplastic resin, and a thermosetting resin including a curable compound, etc. A photosensitive resin and a conductive resin are also preferably used. Examples of the thermoplastic resin include (meta) acryl-based polymer, polyolefin resin, polyamide resin, polystyrene, polycarbonate, polyethylene terephthalate, phenoxy resin, and photosensitive resin. In order to improve the impact resistance, the thermoplastic resin composition may contain other elastomer components. Further, a conductive polymer may be used as the resin, and a conductive characteristic can be manifested by a synergistic effect of graphene and/or graphite and the conductive polymer. The content ratio of the resin to the inorganic particle composite may be appropriately designed according to the needs. The content of the inorganic particle composite to the resin is, for example, 0.1 to 95 mass %.

EXAMPLE

Hereinafter, the present disclosure will be described in more detail with reference to examples. However, the present disclosure is not limited at all by the following examples.

An organic solvent was used without being dried. Commercially available salt was used as it is.

Example 1-1

1 g of molybdenum disulfide (made by Nichimori Co., Ltd.) was added to 100 mL of acetone at room temperature in air and then stirred. 0.1 g of potassium phosphate powder was added to this mixture, and the mixture was irradiated with high power ultrasound waves (600 W, made by SMT) for 10 minutes. The molybdenum disulfide was a clear dispersion in acetone before potassium phosphate was added (left sample bottle in FIG. 1), but after the addition of salt and 10 minutes of ultrasonic treatment, the dispersibility dramatically improved, and a dark dispersion was obtained (right sample bottle in FIG. 1). A part of the obtained suspension was collected, and a sample dropped onto the TEM grid was observed by a transmission electron microscopy (TEM). As a result, it was confirmed that thin and transparent molybdenum disulfide nanosheets were formed, as shown in the photograph on the right side of FIG. 1.

Example 1-2

Figure 2:
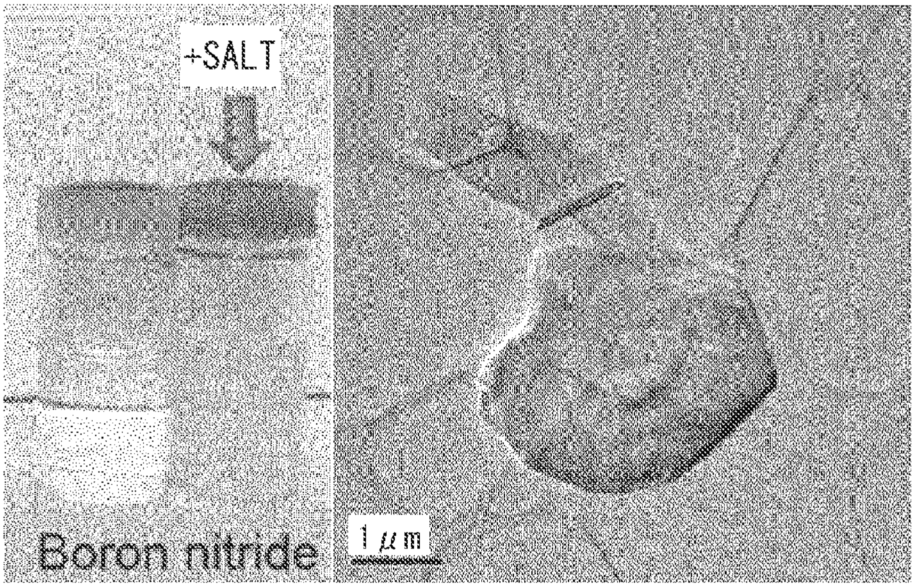
FIG. 2 is a TEM image of a dispersion according to Example 1-2 (the left side of the drawing shows a sample bottle before salt is added, and the right side of the drawing shows a sample bottle after salt is added) and a layered nanoplate composite according to Example 1-2.

A dispersion was obtained by the method similar to that in Example 1-1, except that boron nitride (made by Showa Denko) was used instead of molybdenum disulfide. Before potassium phosphate was added, boron nitride was clear white in acetone (left sample bottle in FIG. 2), but after the addition of salt and 10 minutes of a ultrasonic treatment, the dispersibility was dramatically improved, and a cloudy white dispersion was obtained (left sample bottle in FIG. 2). When the TEM image was observed by the method similar to that in Example 1-1, it was confirmed that semitransparent nanosheets having a sufficiently thin layer thickness compared with that before the addition of the salt were formed as shown in FIG. 2.

Example 1-3

Figure 3:
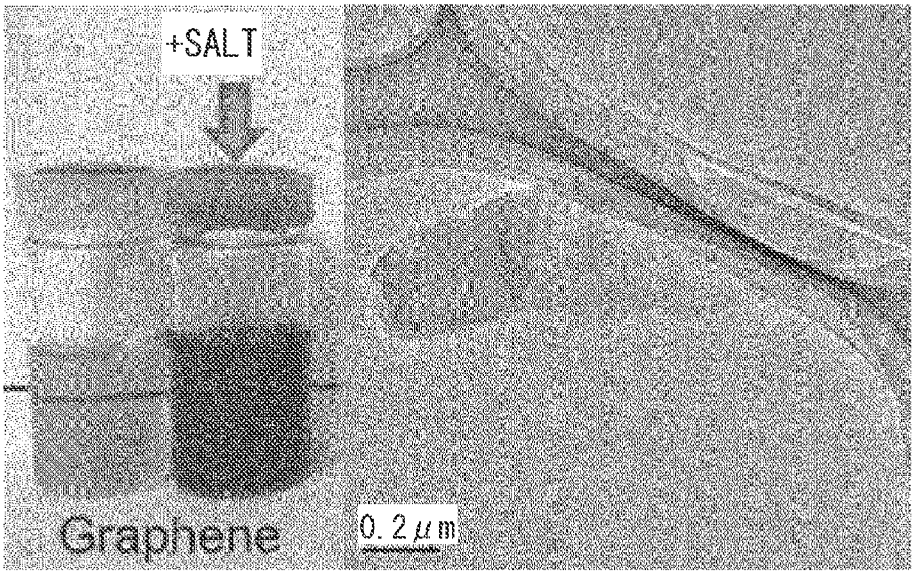
FIG. 3 is a TEM image of a dispersion according to Example 1-3 (the left side of the drawing shows a sample bottle before salt is added, and the right side of the drawing shows a sample bottle after salt is added) and a layered nanoplate composite according to Example 1-3.

A dispersion was obtained by the method similar to that in Example 1-1, except that graphite (made by Wako Pure Chemical Industries, Ltd.) was used instead of molybdenum disulfide. Before potassium phosphate was added, graphite was a gray clear graphene dispersion in acetone (left sample bottle in the drawing). On the other hand, after the addition of potassium phosphate and an ultrasonic treatment, the dispersibility was dramatically improved, and a black opaque dispersion was obtained (right sample bottle in the drawing). When a TEM image was observed by the method similar to that in Example 1-1, transparent graphene nanosheets were observed as shown in FIG. 3.

Examples 1-4 to 1-24

The dispersions according to Examples 1-4 to 1-24 were obtained under the conditions shown in Table 1. Conditions other than those shown in Table 1 were the same as those in Example 1-1. In each of Examples 1-14 to 1-19 and 1-21 to 1-23, the mixture was centrifuged (1500 rpm×30 minutes) as a size fractionation step, and a supernatant was collected.

TABLE 1

| | | Layered mineral powder (g) | | Solvent (mL) | | Salt (g) | | Mixing means (processing condition) | |
|---|---|---|---|---|---|---|---|---|---|
| EXAMPLE | -4 | Graphite 1 | 0.5 | Acetone | 100 | Sodium carbonate | 0.1 | High power ultrasonic waves | 5 mins |
| | -5 | Graphite 1 | 0.5 | Acetone | 100 | Potassium carbonate | 0.1 | High power ultrasonic waves | 5 mins |
| | -6 | Graphite 1 | 0.5 | Acetone | 100 | Ammonium carbonate | 0.1 | High power ultrasonic waves | 5 mins |
| | -7 | Graphite 1 | 0.5 | Acetone | 100 | Sodium acetate | 0.1 | High power ultrasonic waves | 5 mins |
| | -8 | Graphite 1 | 0.5 | Acetone | 100 | Potassium acetate | 0.1 | High power ultrasonic waves | 5 mins |
| | -9 | Graphite 1 | 0.5 | Acetone | 100 | Sodium dihydrogen phosphate | 0.1 | High power ultrasonic waves | 5 mins |
| | -10 | Graphite 1 | 0.5 | Acetone | 100 | Trisodium phosphate | 0.1 | High power ultrasonic waves | 5 mins |
| | -11 | Graphite 1 | 0.5 | Acetone | 100 | Tripotassium phosphate | 0.1 | High power ultrasonic waves | 5 mins |
| | -12 | Graphite 1 | 0.5 | Acetone | 100 | Rochelle salt | 0.1 | High power ultrasonic waves | 5 mins |
| | -13 | Graphite 1 Graphite | 0.5 | Acetone | 100 | Sodium citrate | 0.1 | High power ultrasonic waves | 5 mins |

TABLE 1-continued

| | Layered mineral powder (g) | | Solvent (mL) | | Salt (g) | | Mixing means (processing condition) | |
|---|---|---|---|---|---|---|---|---|
| -14 | Graphite 1 | 0.1 | Acetone | 100 | Ammonium carbonate | 0.5 | High power ultrasonic waves | 5 mins |
| -15 | Graphite 1 | 0.1 | 2-poropanol | 100 | Ammonium carbonate | 0.5 | High power ultrasonic waves | 5 mins |
| -16 | Graphite 1 | 0.1 | Ethanol | 100 | Ammonium carbonate | 0.5 | High power ultrasonic waves | 5 mins |
| -17 | Graphite 1 | 0.1 | Tetrahydrofuran | 100 | Ammonium carbonate | 0.5 | High power ultrasonic waves | 5 mins |
| -18 | Graphite 1 | 1 | 2-propanol | 50 | Ammonium carbonate | 0.05 | Pressure homogenizer | 40 MPa, 1 pass |
| -19 | Graphite 2 | 1 | 2-propanol | 50 | Ammonium carbonate | 0.05 | Pressure homogenizer | 40 MPa, 1 pass |
| -20 | Graphite 1 | 1 | Acetone<br>Ethanol | 90<br>10 | Ammonium carbonate | 0.1 | High power ultrasonic waves | 5 mins |
| -21 | Graphite 1 | 1 | Acetone<br>NMP | 90<br>10 | Ammonium carbonate | 0.1 | High power ultrasonic waves | 5 mins |
| -22 | Graphite 1 | 1 | Acetone<br>Toluene | 50<br>50 | Ammonium carbonate | 0.1 | High power ultrasonic waves | 5 mins |
| -23 | Graphite 2 | 6 | 2-propanol | 100 | Ammonium carbonate | 0.1 | High power ultrasonic waves | 5 mins |
| -24 | Graphite 3 | 0.2 | Acetone | 100 | Tripoiassium phosphate | 0.2 | High power ultrasonic waves | 10 mins |

*: Graphite 1: made by Wako Pure Chemical Industries, Ltd.,
Graphite 2: fine graphite powder (Ito Graphite Co., Ltd., Z-5F),
Graphite 3: expanded graphite, pressure homogenizer: L-ED made by Yoshida Kikai Co., Ltd.

Comparative Examples 1-1 to 1-9

The dispersions according to Comparative Examples 1-1 to 1-9 were obtained under the conditions shown in Table 2. Conditions other than those shown in Table 2 were the same as those in Example 1-1.

TABLE 2

| | | Layered mineral powder (g) | | Organic solvent (mL) | | Salt (g) | | Processing (condition) | |
|---|---|---|---|---|---|---|---|---|---|
| COMPARATIVE EXAMPLE | 1-1 | Graphite 1 | 0.5 | Acetone | 100 | Sodium chloride | 0.1 | High power ultrasonic waves | 5 mins |
| | 1-2 | Graphite 1 | 0.1 | Acetone | 100 | — | — | High power ultrasonic waves | 5 mins |
| | 1-3 | Graphite 1 | 0.1 | 2-propanol | 100 | — | — | High power ultrasonic waves | 5 mins |
| | 1-4 | Graphite 1 | 0.1 | Ethanol | 100 | — | — | High power ultrasonic waves | 5 mins |
| | 1-5 | Graphite 1 | 0.1 | Tetrahydrofuran | 100 | — | — | High power ultrasonic waves | 5 mins |
| | 1-6 | Graphite 1 | 1 | Acetone<br>Ethanol | 90<br>10 | — | — | High power ultrasonic waves | 5 mins |
| | 1-7 | Graphite 1 | 1 | Acetone<br>NMP | 90<br>10 | — | — | High power ultrasonic waves | 5 mins |
| | 1-8 | Graphite 1 | 1 | Acetone<br>Toluene | 50<br>50 | — | — | High power ultrasonic waves | 5 mins |

TABLE 2-continued

| | Layered mineral powder (g) | | Organic solvent (mL) | | Salt (g) | | Processing (condition) | |
|---|---|---|---|---|---|---|---|---|
| 1-9 | Graphite 3 | 0.2 | Acetone | 100 | — | — | High power ultrasonic waves | 10 mins |

The supernatant of Examples 1-4 to 1-23 was collected, and the absorbance was measured as shown in Table 3. The absorbance of the supernatant of Comparative Examples 1-1 to 1-8 was measured by the method similar to that in Examples 1-4 to 1-23 as shown in Table 4.

TABLE 3

| | Absorbance |
|---|---|
| Example 1-4 | 0.674 |
| Example 1-5 | 1.25 |
| Example 1-6 | 1.11 |
| Example 1-7 | 0.98 |
| Example 1-8 | 1.04 |
| Example 1-9 | 0.674 |
| Example 1-10 | 1.04 |
| Example 1-11 | 1.24 |
| Example 1-12 | 0.689 |
| Example 1-13 | 0.788 |
| Example 1-14 | 0.98 |
| Example 1-15 | 1.346 |
| Example 1-16 | 0.91 |
| Example 1-17 | 1.25 |
| Example 1-18 | 3.84 |
| Example 1-19 | 10.3 |
| Example 1-20 | 1.23 |
| Example 1-21 | 1.16 |
| Example 1-22 | 1.32 |
| Example 1-23 | 35 |

TABLE 4

| | Absorbance |
|---|---|
| Comparative Example 1-1 | 0.016 |
| Comparative Example 1-2 | 0.016 |
| Comparative Example 1-3 | 0.234 |
| Comparative Example 1-4 | 0.17 |
| Comparative Example 1-5 | 0.327 |
| Comparative Example 1-6 | 0.035 |
| Comparative Example 1-7 | 0.014 |
| Comparative Example 1-8 | 0.14 |

As shown in Tables 3 and 4, it was confirmed that the addition of salt significantly improved the dispersibility.

The absorbance of the dispersion of Example 1-19 was measured under the conditions similar to those in Example 1-18, except that jet-milled fine graphite powder was used. It was confirmed that the absorbance was improved to 10.3 by one treatment.

Further, the absorbance of the dispersion of Example 1-20 consisting of a mixed organic solvent of acetone and ethanol was 1.23. On the other hand, the absorbance of the dispersion of Comparative Example 1-6 under the same conditions as those in Example 1-20 except that no salt was added was 0.035, and it was confirmed that the dispersibility could be remarkably improved by adding salt.

The absorbance of the dispersion of Example 1-21 consisting of a mixed organic solvent of acetone and NMP was 1.16. On the other hand, the absorbance of the dispersion of Comparative Example 1-7 under the same conditions as those in Example 1-21 except that no salt was added was 0.014, and it was confirmed that the dispersibility was remarkably improved.

The absorbance of the dispersion of Example 1-22 consisting of an organic solvent mixture of acetone and toluene was 1.32. On the other hand, the absorbance of the dispersion of Comparative Example 1-8 under the same conditions as those in Example 1-22 except that no salt was added was 0.14, and it was confirmed that the dispersibility was remarkably improved by adding salt.

The absorbance of the high-concentration graphene dispersion of Example 1-23 obtained using graphite Z5F (made by Ito Graphite Co., Ltd.) having a small particle size was 35, and it was confirmed that the high-concentration graphene dispersion having a graphene concentration of about 1.06 g/L could be obtained in only 5 minutes.

Figure 4:
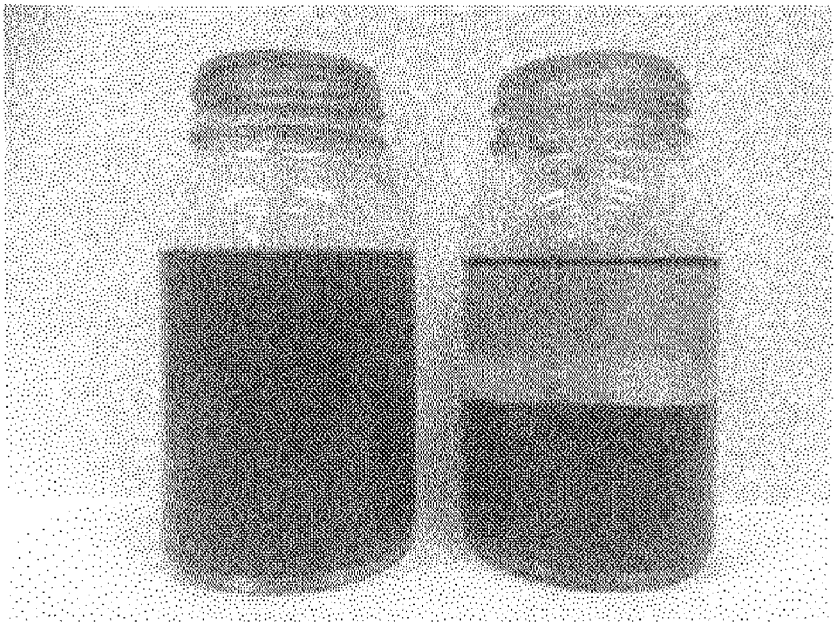
FIG. 4 is a photograph of a dispersion according to Example 1-24 (the left side of the drawing) and a photograph of a dispersion according to Comparative Example 1-9 (the right side of the drawing)

In the dispersion of Example 1-24, although sedimentation was observed with time, it was confirmed that a black-colored opaque dispersion remained after 24 hours (left photograph in FIG. 4). On the other hand, in Comparative Example 1-9, which was conducted under the same conditions as those in Example 1-24 except that no salt was added, it was confirmed that the dispersion was settled in only 30 minutes, and that a supernatant liquid was transparent (right photograph in FIG. 4).

Figure 5:
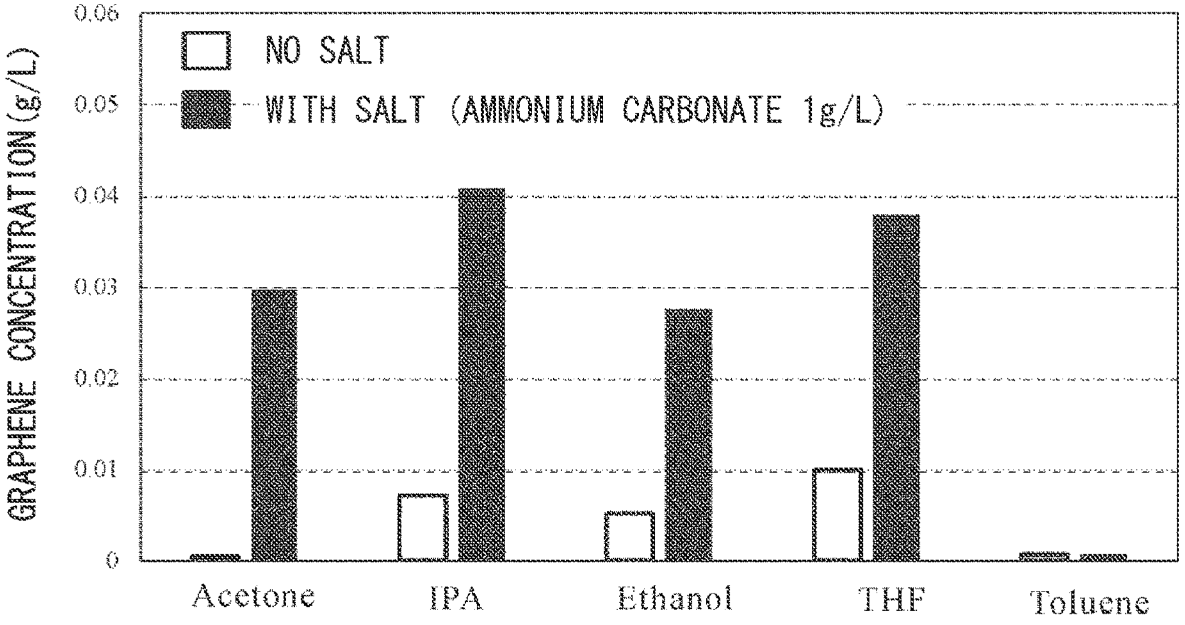
FIG. 5 is a graph plotting a graphene concentration when graphene is added to an organic solvent (without addition of salt VS with salt addition)

Next, two test tubes each containing 100 mL of solvents of acetone, isopropanol, ethanol, THF, and toluene were prepared, and 0.5 g of natural graphite was added to each test tube. Then, salt (ammonium carbonate) was added at 1 g/L to only one of the pair of test tubes (2 test tubes) of the solvent. These tubes were subjected to an ultrasonic treatment for 5 min. After that, the mixture was centrifuged at 1500 rpm for 30 minutes, the absorbance at 660 nm was measured, and the measured value was divided by the absorbance coefficient (3300) to determine the graphene concentration g/L. The results are shown in FIG. 5.

It was confirmed that the graphene concentration of the dispersion using acetone, isopropanol, ethanol, and THF was remarkably improved by adding salt. In the case of toluene, it was confirmed that the graphene concentration was low regardless of the addition of salt.

Dispersibility Evaluation 2-1

Example 2-1

Figure 7:
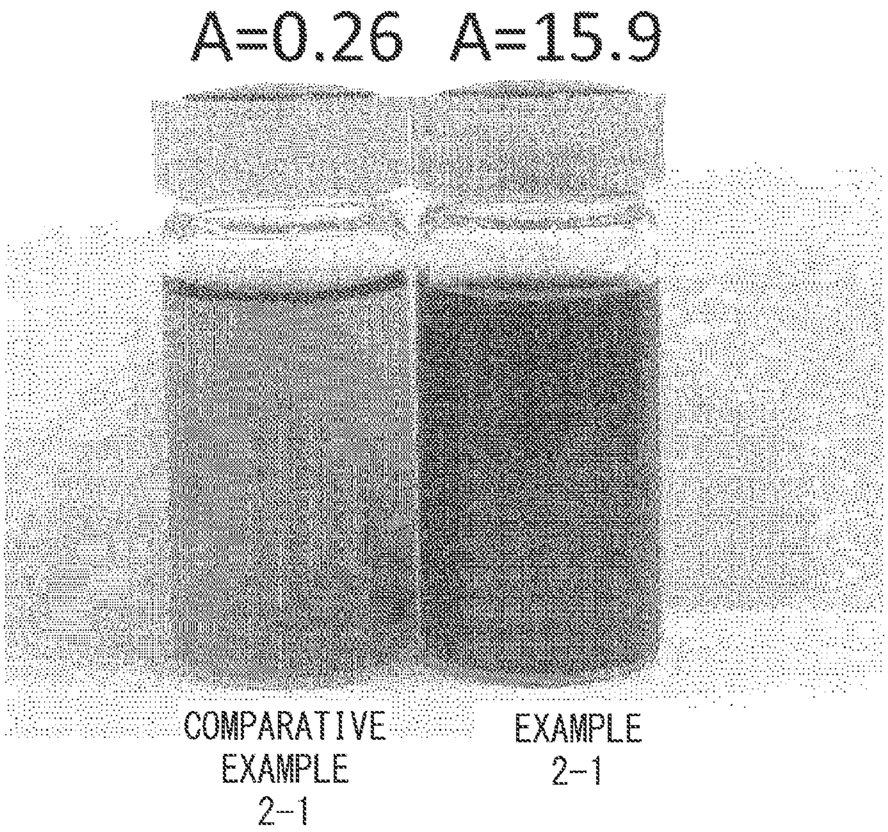
FIG. 7 is a photograph of a dispersion according to Comparative Example 2-1 (the left side of the drawing) and an inorganic particle composite dispersion according to Example 2-1 (the right side of the drawing)

At room temperature, 2 g of carbon nanotubes (NC 7000, made by Nanocyl SA) and 2 g of sodium glutamate were mixed in air, and the mixture was subjected to a mixing treatment for 30 minutes by a ball mill (P-6 (made by Fritsch), ball diameter 20 mm, rotation speed 500 ppm). Then, the mixture was washed with water and filtered to obtain an inorganic particle composite. 0.1 g of the inorganic particle composite thus obtained was added to 100 mL of acetone, subjected to an ultrasonic treatment for 5 minutes, and subjected to a centrifugal treatment (1500 rpm, 30 minutes). A photograph of the obtained dispersion is shown on the right side of FIG. 7. The absorbance of the supernatant of this dispersion was A=15.9. In the present specification, the absorbance indicates a result of the supernatant of the dispersion.

Comparative Example 2-1 g of carbon nanotubes (NC 7000) was added to 100 mL of acetone at room temperature in air. After that, the same processing as that in Example 2-1 was performed. The absorbance of this dispersion was A=0.26. A photograph of the obtained dispersion is shown on the left side of FIG. 7.

Comparative Example 2-2

Figure 8:
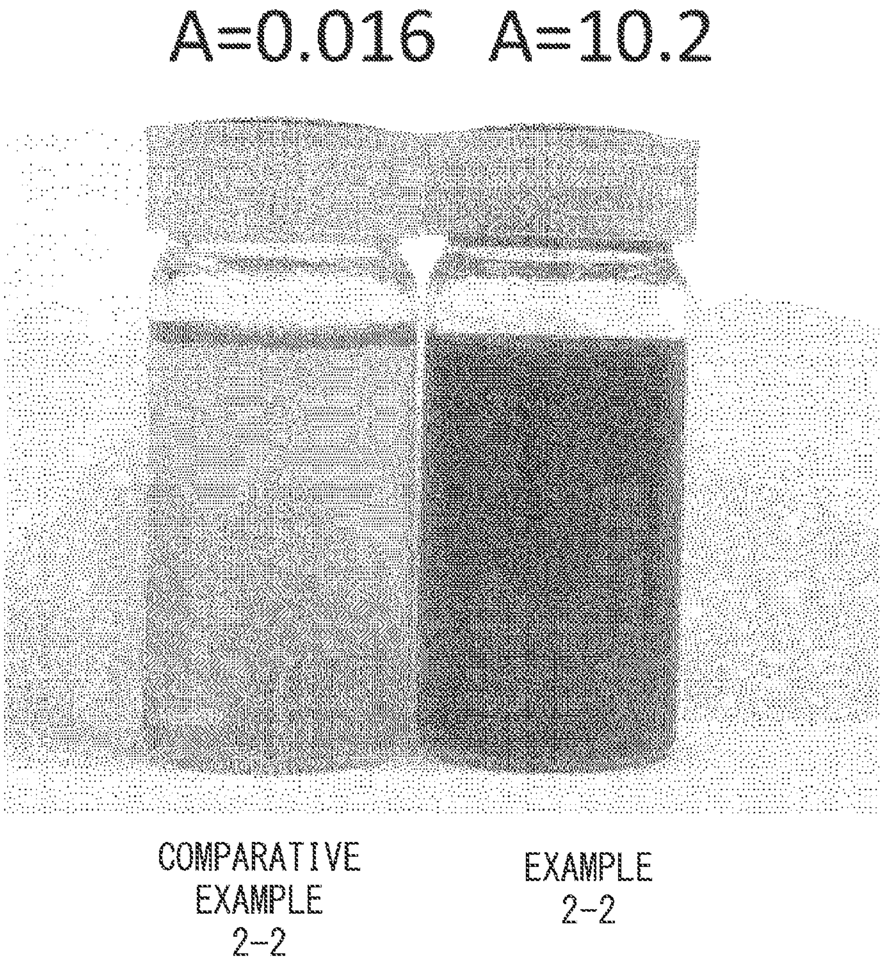
FIG. 8 is a photograph of a dispersion according to Comparative Example 2-2 (the left side of the drawing) and an inorganic particle composite dispersion according to Example 2-2 (the right side of the drawing)

A dispersion was obtained by the method similar to that in Comparative Example 2-1, except that the carbon nanotubes were changed to molybdenum disulfide (T powder, made by Daizo, average particle diameter 3.5 μm). A photograph of the obtained dispersion is shown on the left side of FIG. 8. The absorbance of this dispersion was A=0.016.

Example 2-2

An inorganic particle composite was obtained by the method similar to that in Example 2-1, except that molybdenum disulfide (T powder) was used instead of carbon nanotubes. The average particle diameter (D50) of the composite was about 3.5 μm, and there was no change from the starting material. Further, the same treatment as that in Example 2-1 was performed to obtain a dispersion. A photograph of the obtained dispersion is shown on the right side of FIG. 8. The absorbance of this dispersion was A=10.2. The size of the nanosheet was about 50 to 500 nm and the thickness was 15 nm or less.

Comparative Example 2-3

Figure 9:
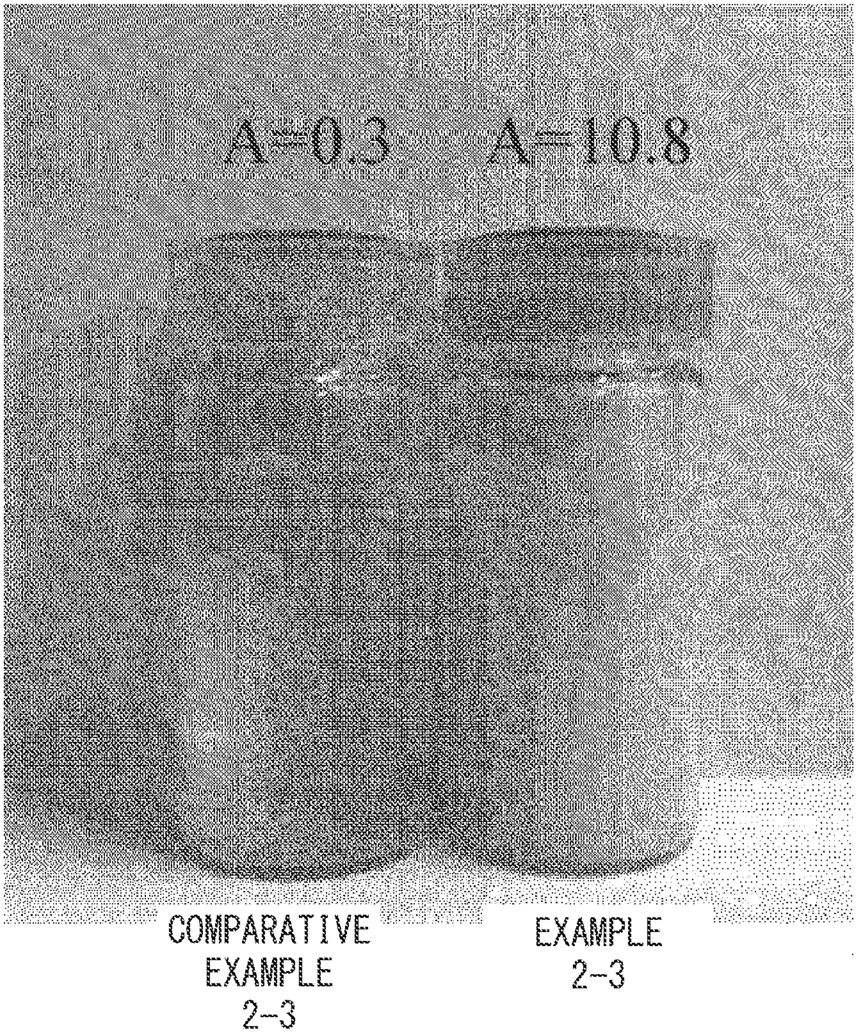
FIG. 9 is photographs of a dispersion according to Comparative Example 2-3 (the left side of the drawing) and an inorganic particle composite dispersion according to Example 2-3 (the right side of the drawing)

A dispersion was obtained by the method similar to that in Comparative Example 2-1, except that the carbon nanotubes were changed to boron nitride (UHP-2, made by Showa Denko K. K., average particle diameter 11 μm). A photograph of the obtained dispersion is shown on the left side of FIG. 9. The absorbance of this dispersion was A=0.3.

Example 2-3

An inorganic particle composite was obtained by the method similar to that in Example 2-1, except that boron nitride (UHP-2) was used instead of carbon nanotubes. The average particle diameter was about 8 μm. Further, the same treatment as that in Example 2-1 was performed, and a dispersion was obtained. A photograph of the obtained dispersion is shown on the right side of FIG. 9. The absorbance of the supernatant of this dispersion was A=10.8.

It was confirmed that the dispersions of Examples 2-1 to 2-3 had significantly improved dispersibility compared to the dispersions of Comparative Examples 2-1 to 2-3. The size of the nanosheet of Example 2-3 was about 50 to 500 nm and the thickness thereof was 10 nm or less.

Comparative Example 2-4

An inorganic particle composite was obtained by the method similar to that in Example 2-1, except that 5 g of natural graphite (average particle diameter: 500 μm, made by Aldrich) was used at room temperature in air in place of carbon nanotubes, and no water-soluble salt was used. A dispersion of nanoparticles was obtained by the same treatment as that in Example 2-1.

Comparative Example 2-5 to 2-7

An inorganic particle composite was obtained by the method similar to that in Comparative Example 2-4 except that the salt shown in Table 5 was used as the water-soluble salt. A dispersion of nanoparticles was obtained by the same treatment as the treatment of Comparative Example 2-4. The obtained nanoparticles were 100 to 700 nm in size and 5 nm or less in thickness.

Example 2-4 to 2-9

An inorganic particle composite was obtained by the method similar to that in Example 2-1 except that 5 g of natural graphite (average particle diameter: 500 made by Aldrich) was used at room temperature in air in place of carbon nanotubes, and the salt shown in Table 5 was used as the water-soluble salt. Further, the same treatment as that in Example 2-1 was performed to obtain a dispersion of the inorganic particle composite.

The absorbance (660 nm) of the dispersions of Comparative Examples 2-4 to 2-7 and Example 2-4 to 2-9 are shown in Table 5.

TABLE 5

| | Type of Salt | Absorbance A (660 nm) |
|---|---|---|
| Comparative example 2-4 | No salt | 0.016 |
| Comparative example 2-5 | Sodium sulphate | 0.032 |
| Comparative example 2-6 | Sodium nitrate | 0.018 |
| Comparative example 2-7 | Sodium chloride | 2.61 |
| Example 2-4 | Sodium glutamate | 7.0 |
| Example 2-5 | Sodium acetate | 11.2 |
| Example 2-6 | Potassium sodium tartrate | 9.2 |
| Example 2-7 | Ammonium tartrate | 3.9 |
| Example 2-8 | Tripotassium phosphate | 8.28 |
| Example 2-9 | Potassium carbonate | 11.2 |

The absorbance of the dispersions of the inorganic particle composite obtained by using the salt of the water-soluble according to Example 2-4 to 2-9 has increased by 400 to 900 times the absorbance of the dispersions of Comparative Example 2-4 to 2-7. It can be seen that the dispersibility was remarkably improved by using the weak acid salt according to this example as compared with the salt in which the counter anion of the water-soluble salt becomes a strong acid.

Evaluation of Inorganic Particle Composite

Example 2-10

2 g of fine graphite powder (Z5F, made by Ito Graphite Co., Ltd., average particle diameter 3.6 μm) and 2 g of potassium carbonate were mixed at room temperature in air, and the mixture was treated by a ball mill for 30 minutes. The fine graphite powder was obtained by milling natural graphite by jet mill and micronizing the milled natural graphite. Next, the mixture was washed with ion-exchanged water twice and then filtered, and an inorganic particle composite was obtained. The average particle size of the inorganic particle composite was 4 μm and secondary aggregation proceeded, thereby increasing the apparent particle size. The potassium concentration of the inorganic particle composite was measured by an electron probe micro analyzer (EPMA). As a result, 920 ppm potassium was detected.

Example 2-11

An inorganic particle composite was obtained by the method similar to that in Example 2-10 except that natural graphite (average particle diameter: 500 made by Aldrich) was used. The potassium concentration of the inorganic particle composite was measured by EPMA. As a result, 0.018 to 0.034% (180-340 ppm) of potassium was detected.

Example 2-12

The treatment similar to that in Example 2-11 was also performed on molybdenum disulfide and carbon nanotubes, and the potassium content was measured. 2000 ppm of potassium was detected in the composite of the molybdenum disulfide, and 1270 ppm of potassium was detected in the composite of the carbon nanotubes.

Comparative Example 2-8

2 g of potassium carbonate was dissolved in 100 mL of ion-exchange water, 2 g of graphite (Z5F) was immersed in the solution, stirred and filtered, washed with water once, and dried. The concentration of potassium in the obtained powder was measured by EPMA. As a result, potassium was not detected from the graphite powder (detection limit was 30 ppm).

Comparative Example 2-9

In similar samples of graphite, molybdenum disulfide, and carbon nanotubes ball-milled without adding salt, it was confirmed that potassium was below the detection limit (30 ppm).

From these results, it can be seen that the potassium component and the inorganic particles form a composite in the inorganic particle composite according to this example.

Dispersibility Evaluation 2-2

The dispersibility of nanoparticles is governed by the surface tension of the solvent. The dispersibility at various surface tensions by changing the ratio of water (73 mN/m) having a high surface tension to propanol (21 mN/m) was evaluated. An example of a result of the evaluation will be described below.

Figure 10:
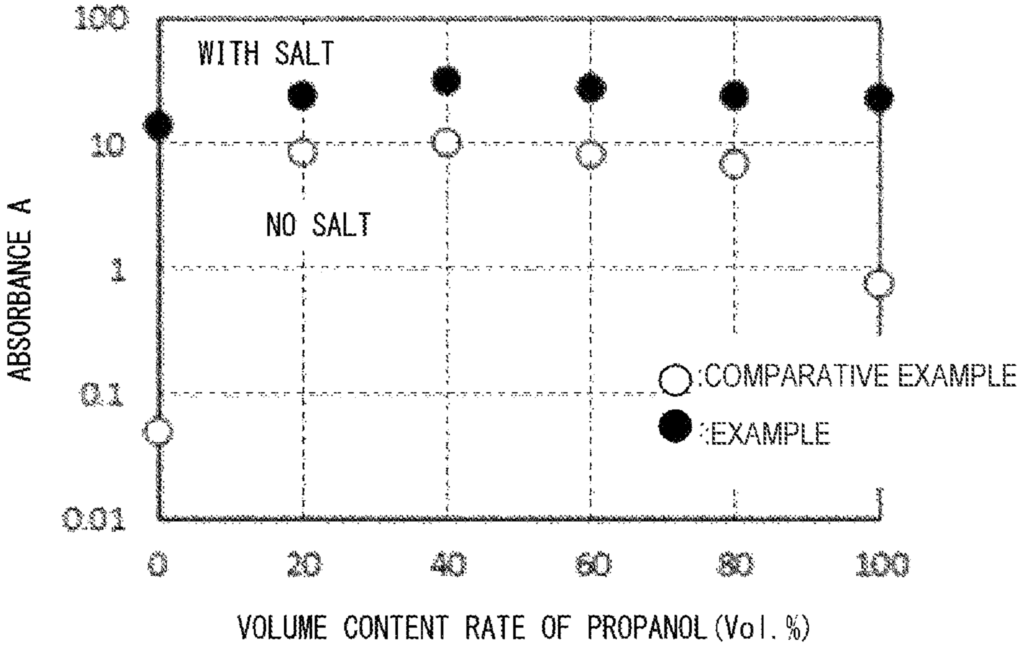
FIG. 10 is a graph showing dispersibility of an inorganic particle composite according to Example 2-10 in a mixed solvent of water and propanol.

FIG. 10 shows a result of evaluating the dispersibility of the inorganic particle composite of Example 2-10 using water/propanol at different mixing ratios. For reference, the result of evaluating the dispersibility of the particles obtained in the process similar to that in Example 2-10 except that the water-soluble salt was not added is also shown.

Example 2-13

Figure 11:
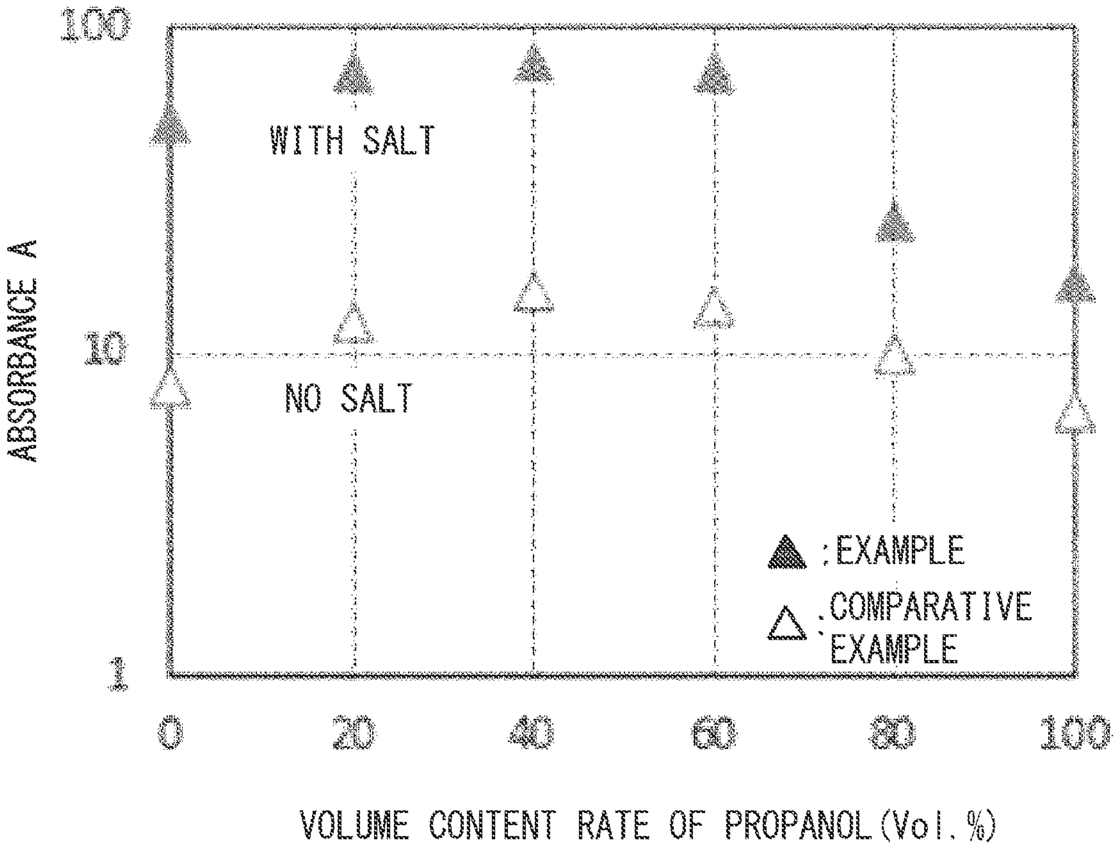
FIG. 11 is a graph showing dispersibility of an inorganic particle composite according to Example 2-13 in a mixed solvent of water and propanol.

An inorganic particle composite was obtained by the method similar to that in Example 2-10, except that graphite (Z5F) was changed to molybdenum disulfide (T powder). FIG. 11 shows a result of evaluating the dispersibility of the obtained inorganic particle composite with different mixing ratios of water/propanol.

Figure 12:
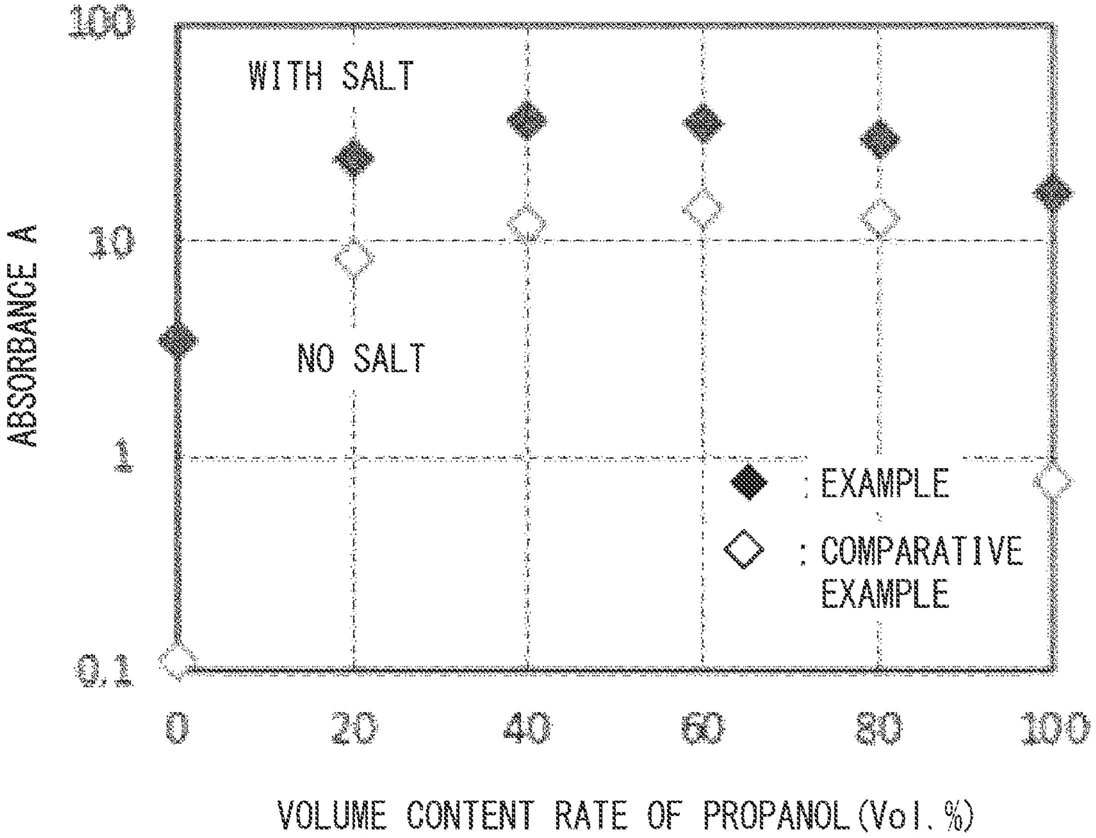
FIG. 12 is a graph showing dispersibility of an inorganic particle composite according to Example 2-1 in a mixed solvent of water and propanol.

FIG. 12 shows the result of evaluating the dispersibility of the inorganic particle composite obtained by the method similar to that in Example 2-1 with different mixing ratios of water/propanol.

As shown in FIGS. 10 to 12, it can be seen that the dispersion of the inorganic particle composite according to this example was remarkably excellent in dispersibility regardless of the difference in surface tension of the solvent.

Dispersibility Evaluation 2-3

Example 2-14

2 g of graphite (Z5F) and 2 g of potassium carbonate were mixed, and 10 mL of ethanol was added to make a paste having a graphite concentration of 200 g/L. The paste was ball-milled for 10 minutes and washed with water to remove the powder. 0.5 g of the obtained powder was added to 100 mL of propanol and subjected to an ultrasonic treatment for 5 minutes. The dispersion was centrifuged at 1500 rpm for 30 minutes to remove aggregates, and the absorbance (660 nm) was measured. The obtained absorbance A was 3.3, and an opaque dark dispersion was obtained.

Comparative Example 2-10

As a comparative material, a paste was prepared without adding potassium carbonate, the obtained powder was subjected to the treatment similar to that in Example 2-14. As a result of measuring the absorbance, a substantially transparent dispersion was obtained at A=0.016.

It was confirmed that the concentration of the dispersion obtained in Example 2-14, in which the water-soluble salt was added and the inorganic powder was mixed in a paste form, was 200 times higher than that in Comparative Example 2-10. It was also confirmed that the paste of Example 2-14 maintained its viscosity even after 1 week, and that the inorganic composite particles (graphite) were not separated, and that the paste had excellent dispersibility (stability) in the paste state.

Comparative Example 2-11

0.5 g of graphite (Z5F) was added to 100 mL of water, 0.1 g of potassium carbonate was added to the mixture, and the mixture was subjected to ultrasonic exfoliation. The absorbance of the obtained dispersion was 0.1.

Example 2-1

0.5 g of graphite (Z5F) was added to 100 mL of isopropanol, 0.1 g of potassium carbonate was added to the mixture, and the mixture was subjected to ultrasonic exfoliation. The absorbance of the obtained dispersion was 8, and it was confirmed that the dispersibility was enhanced by using IPA.

Example 2-15

5 g of graphite (Z5F) and 5 g of potassium carbonate were mixed in a ball mill for 30 minutes, washed with water, and dried, so that an inorganic particle composite was obtained. 0.5 g of the inorganic particle composite was added to 100 mL of water, subjected to an ultrasonic treatment for 5 minutes, and centrifuged. The absorbance of the obtained dispersion was 26. Dry mixing with water-soluble salt enabled exfoliation and dispersion in water, which has been difficult in the related art (See Comparative Example 2-11).

Example 2-16

5 g of graphite (Z5F) was mixed with 5 g of potassium carbonate in a ball mill for 30 minutes, washed with water, and dried, so that an inorganic particle composite was obtained. 0.5 g of the inorganic particle composite was added to 100 mL of IPA and subjected to an ultrasonic treatment for 5 minutes. The absorbance after centrifugation was 27.

Example 2-17

Figure 13:
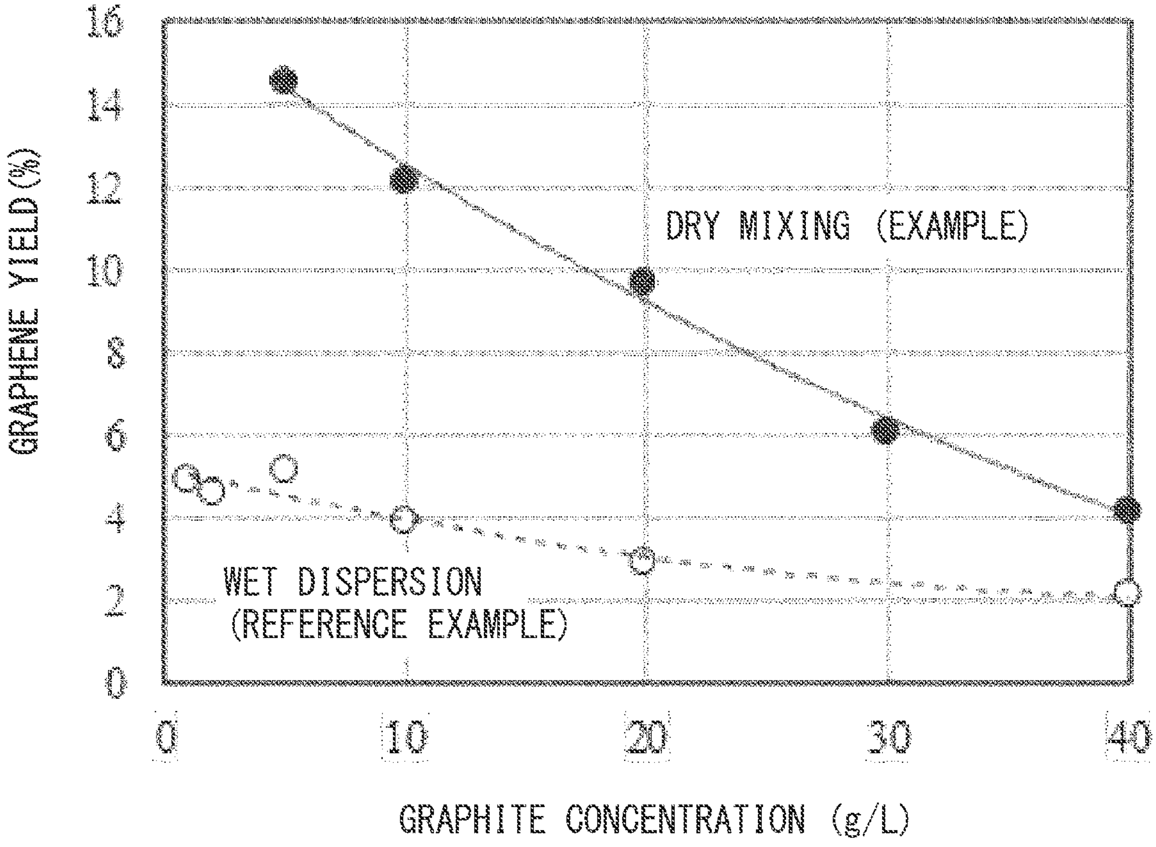
FIG. 13 is a graph plotting a graphene yield (%) for a graphite concentration of an inorganic particle composite according to Example 2-17.

The inorganic particle composite obtained by the method of Example 2-16 was added to IPA to prepare a plurality of samples having different graphene concentrations (graphite concentrations). The graphene yield was then obtained for each sample. The graphene yield was obtained by dividing the obtained graphene concentration by the concentration of the graphite used. The graphene concentrations were calculated by absorbance measurements. For reference, the graphene yield of the graphene dispersion obtained by adding 0.1 g of ammonium carbonate and graphite (Z5F) to 100 mL of IPA, subjecting the mixture to an ultrasonic treatment for 5 minutes, and centrifuging it was also plotted. As shown in FIG. 13, it was confirmed that the graphene yield was higher in the dry mixing than in the wet mixing.

Example 2-18

Figure 14:
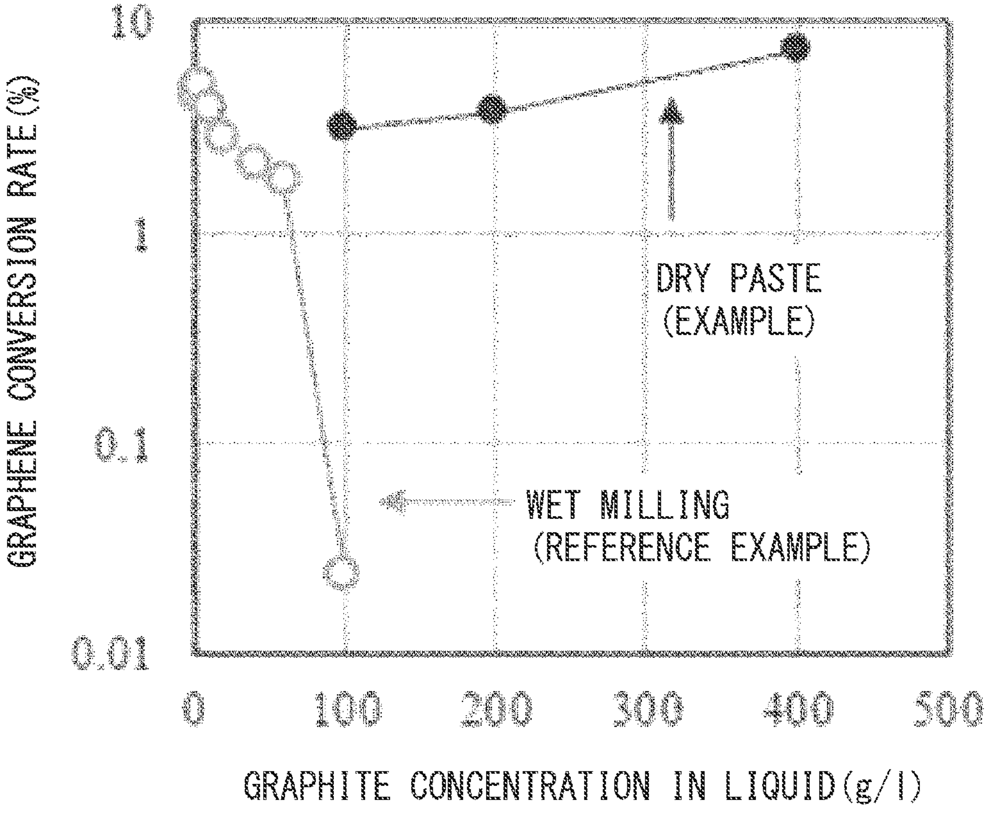
FIG. 14 is a graph plotting a graphene yield (%) for a graphite concentration of an inorganic particle composite according to Example 2-18.

2 g of potassium carbonate was added to 2 g of graphite (Z5F), and 5, 10, 20 mL of ethanol was added (graphite concentrations 400, 200, and 100 g/L) to make a paste, which was ball-milled for 15 minutes. To estimate the graphene concentration of the paste, the paste was diluted with water to remove salt, filtered, and dried. 0.5 g of the obtained powder was added to 100 mL of IPA, irradiated with ultrasonic waves for 1 minute, and subjected to a centrifugal treatment similar to the above centrifugal treatment. The graphene concentration and the graphene conversion rate were determined by measuring the absorbance of the obtained dispersion. The results are shown in FIG. 14. FIG. 14 shows graphene conversion efficiency of wet dispersion for reference. In the wet dispersion, 0.1 g to 10 g of graphite (Z5F) was added to 100 mL of propanol, and 0.1 g of ammonium carbonate was added as a dispersant. The aggregates were removed by the centrifugation treatment at 1500 rpm for 30 minutes, and the absorbance was measured and converted to the graphene concentration. The graphene conversion rate was obtained by dividing the obtained graphene concentration by the initial graphite concentration.

The graphene conversion rate of 2 to 5% was obtained in the wet mixing. On the other hand, when a treatment for mixing salt was performed in a ball mill, a high graphene conversion rate of 3 to 7% was achieved. A slight decrease in the graphene conversion rate was observed when the amount of ethanol added during dry mixing was increased, but it was confirmed that graphene was dispersed at a concentration of 100 g/L or higher in comparison with the wet mixing.

Effect of the Amount of Water-Soluble Salt Added

Example 2-19

With a fixed amount of 2 g of graphite (Z5F), the amount of potassium carbonate added was changed to 0, 0.1, 0.5, 2, and 4 g, and each of the mixed powder was mixed in a ball mill for 15 minutes. Each of the obtained powder was washed with water twice and dried, so that an inorganic particle composite was obtained. 2 g of each of the obtained inorganic particle composites was added to 100 mL of IPA and subjected to an ultrasonic treatment for 5 minutes. Table 6 shows results of the absorbance of the dispersions after centrifugation. As shown in Table 6, it was confirmed that the absorbance was improved by increasing the mass ratio of potassium carbonate to graphite. This indicates that the graphite was efficiently modified by the salt, because a frequency of contact between the graphite and the salt increases with increase of the addition amount of the salt during the dry mixing.

TABLE 6

| Potassium carbonate (g) | Weight ratio of potassium carbonate to graphite | Absorbance A |
|---|---|---|
| 0 | 0 | 0.6 |
| 0.1 | 0.05 | 5.25 |
| 0.5 | 0.25 | 12 |
| 2 | 1 | 26 |
| 4 | 2 | 38 |

Stability Assessment

Example 2-20

5 g of graphite (Z5F) was mixed with 5 g of potassium carbonate. After that, the mixture was washed with water and dried, so that an inorganic particle composite was obtained. 0.5 g of the obtained inorganic particle composite was added to 100 mL of IPA, the mixture was subjected to an ultrasonic treatment for 5 minutes, and then the mixture was centrifuged, so that a dispersion of the inorganic particle composite was obtained. The dispersion stability was evaluated by measuring the absorbance of the dispersion periodically.

Example 2-21

5 g of molybdenum disulfide (T powder) was mixed with potassium carbonate 5 g. After that, the inorganic particle composite was obtained by washing with water and drying. 0.5 g of the obtained inorganic particle composite was added to 100 mL of IPA, the mixture was subjected to an ultrasonic treatment for 5 minutes, and then the mixture was centrifuged, so that a dispersion of the inorganic particle composite was obtained. The dispersion stability was evaluated by measuring the absorbance of the dispersion periodically.

Comparative Example 2-a

A dispersion of IPA was obtained by the method similar to that in Example 2-20, except that potassium carbonate was not added. The dispersion stability was evaluated by measuring the absorbance of the dispersion periodically.

Comparative Example 2-b

A dispersion of IPA was obtained by the method similar to that in Example 2-21, except that potassium carbonate was not added. The dispersion stability was evaluated by measuring the absorbance of the dispersion periodically.

Figure 15:
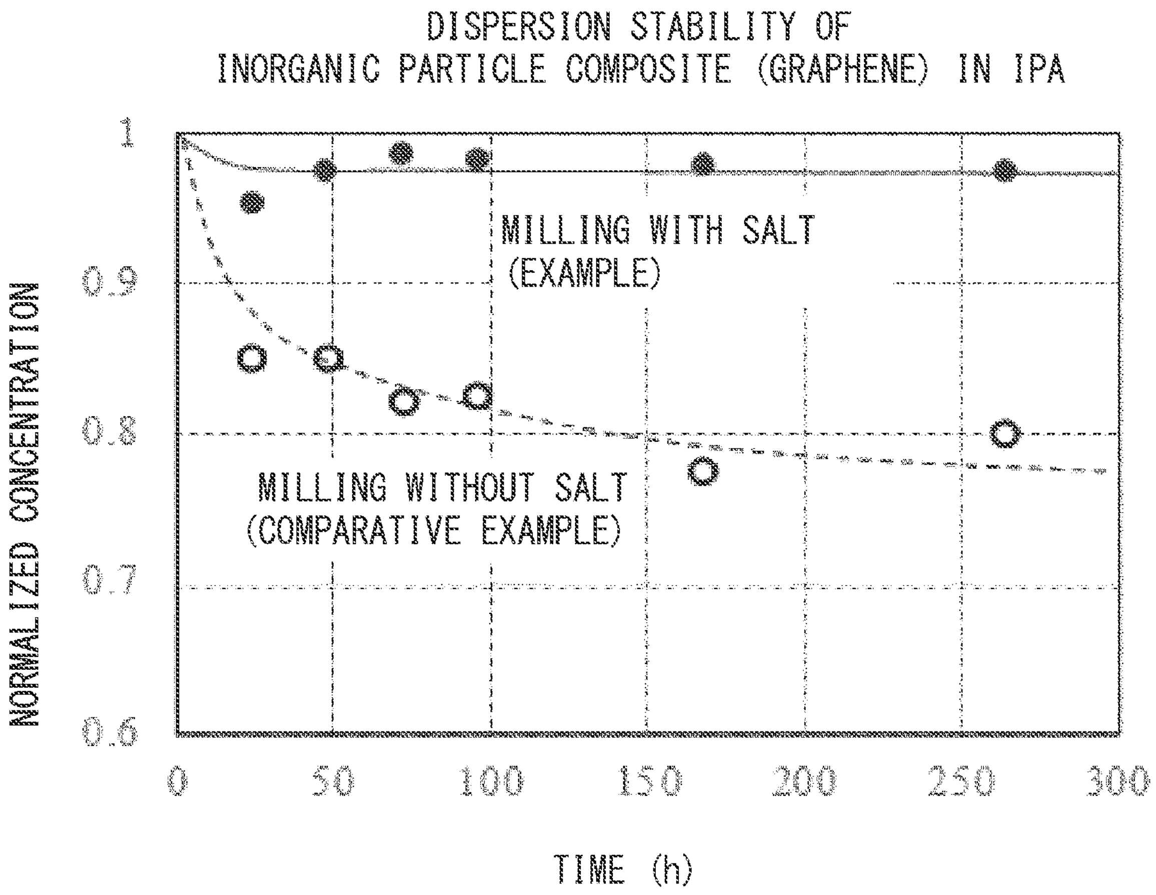
FIG. 15 is a graph showing temporal stability of dispersions according to Example 2-20 and Comparative Example 2-a.
Figure 16:
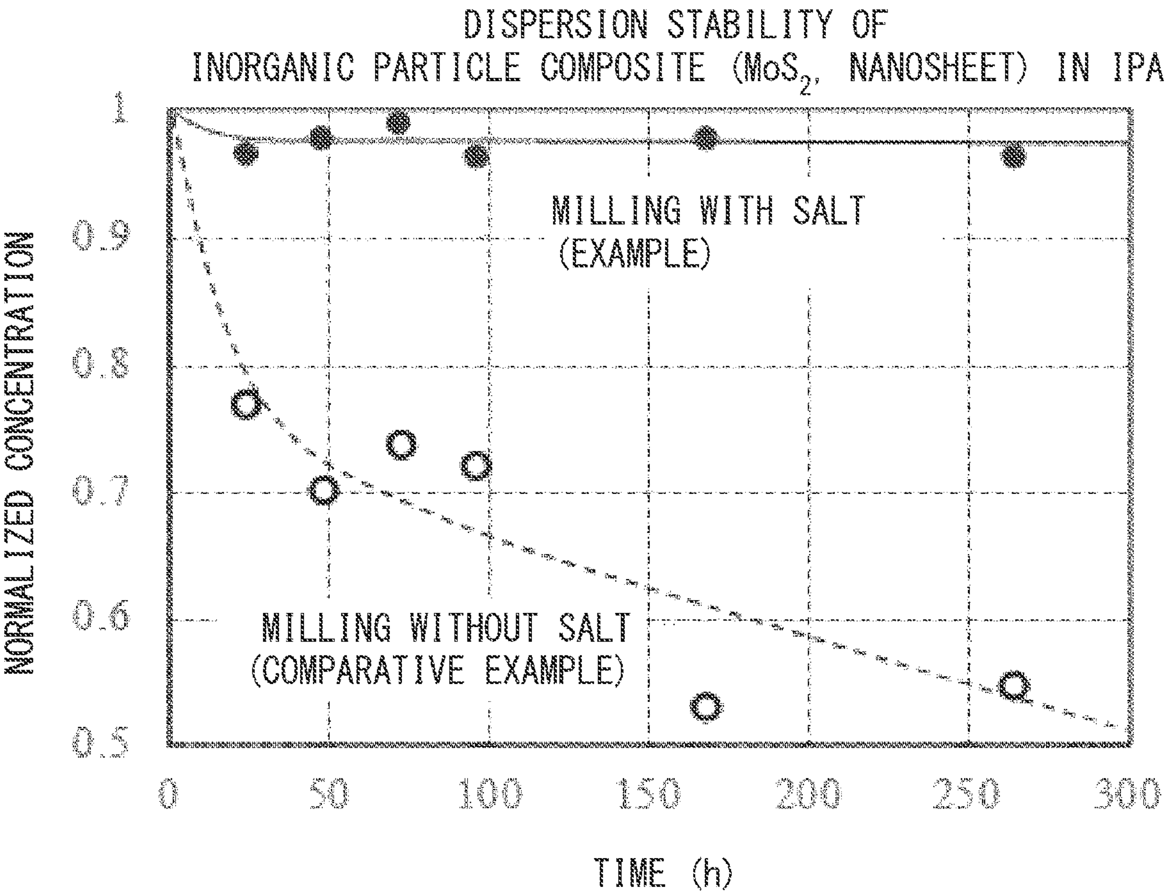
FIG. 16 is a graph showing temporal stability of dispersions according to Example 2-21 and Comparative Example 2-b.

FIG. 15 is a plot of the dispersion stability over time of Example 2-20 and Comparative Example 2-a, and FIG. 16 is a plot of the dispersion stability over time of Example 2-21 and Comparative Example 2-b. The vertical axis in the drawings indicates the concentration normalized with the initial concentration. The initial concentration in Comparative Example 2-a was 0.01 g/L, and that in Example 2-20 was 0.19 g/L. On the other hand, the initial concentration in Comparative Example 2-b was 0.0055 g/L, while the initial concentration in Example 2-21 was 0.27 g/L. It was confirmed that the concentrations in both Examples 2-20 and 2-21 were high and were excellent in the dispersion stability. No sedimentation was observed in these examples.

Zeta Potential Measurement

Figure 17:
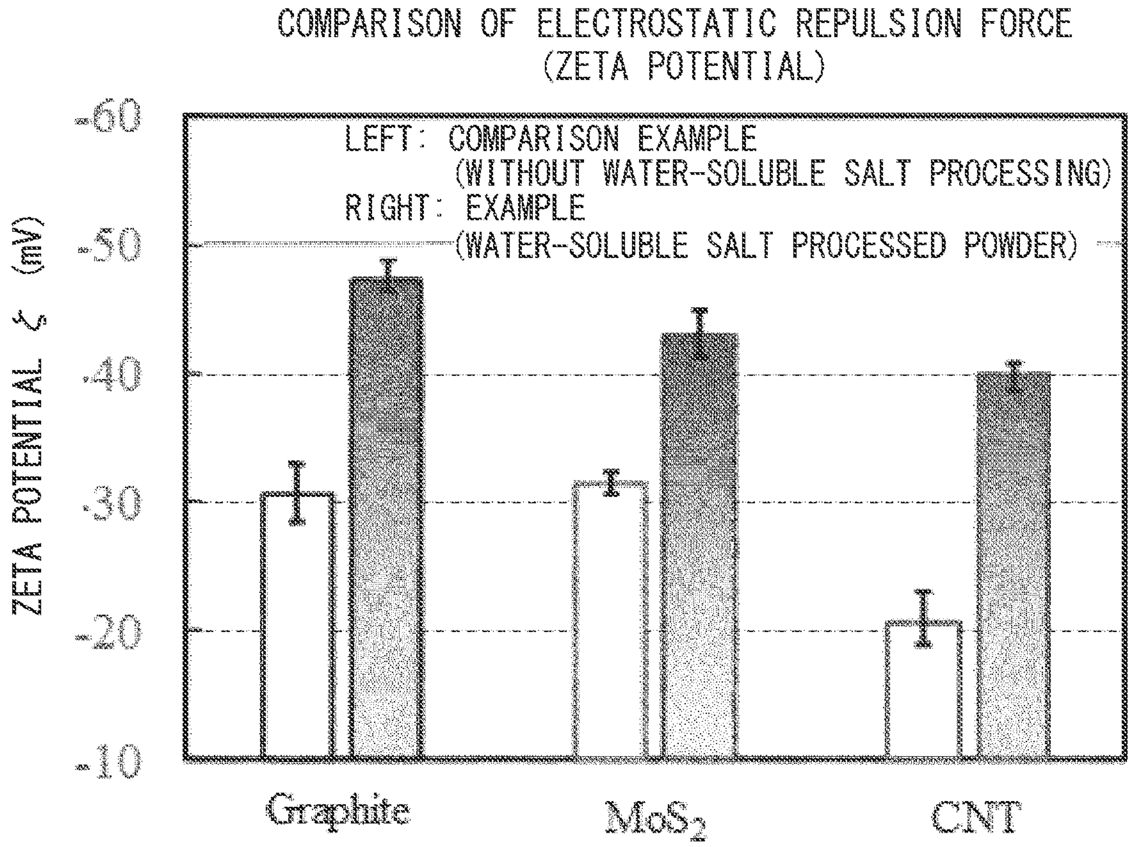
FIG. 17 is a graph in which zeta potentials according to Examples 2-10 and 2-12 are compared with that according to Comparative Example.

Samples of graphite, molybdenum disulfide, and CNT treated with water-soluble salt (Example 2-10, 2-12) and samples according to Comparative Examples 2- under the same conditions, except that no water-soluble salt was added were prepared, and 0.5 g of each sample (solid content) was introduced to a mixed solvent of IPA and water (volume ratio 4:6), and the mixture was subjected to an ultrasonic treatment for 5 minutes, and then centrifuged at 1500 rpm for 30 minutes. The obtained dispersion was used as a sample. This dispersion was diluted with water, and the zeta potential was measured. The results are shown in FIG. 17.

The zeta potential was measured by diluting the dispersion more than 20 times with ion-exchanged water and measuring the diluent with a nanoparticle analyzer (SZ-100, HORIBA). As a result of the measurement, in each of Comparative Examples 2-, the zeta potential was about −20 to −31 mV, and the dispersion was unstable. On the other hand, the zeta potential of the inorganic particle composite according to Example was in the range of −40 to −47 mV, and it was confirmed that the negative zeta potential was high and that the dispersion stability was very high. As described in FIG. 6, it is assumed that this is a result of the ionization of the component of the water-soluble salt included in the inorganic particle composite and the fluctuation of the cations around the particles.

Example 2-22

3 g of graphite and 3 g of potassium carbonate were mixed with 30 mL of ethanol to adjust the graphite concentration to 100 g/L, and the mixture was treated in a ball mill for 15 minutes.

Comparative Example 2-12

3 g of graphite was added to 100 mL of ethanol, and further 0.1 g of ammonium carbonate was added to the mixture, and then the mixture was subjected to an ultrasonic treatment for 5 minutes.

Figure 18:
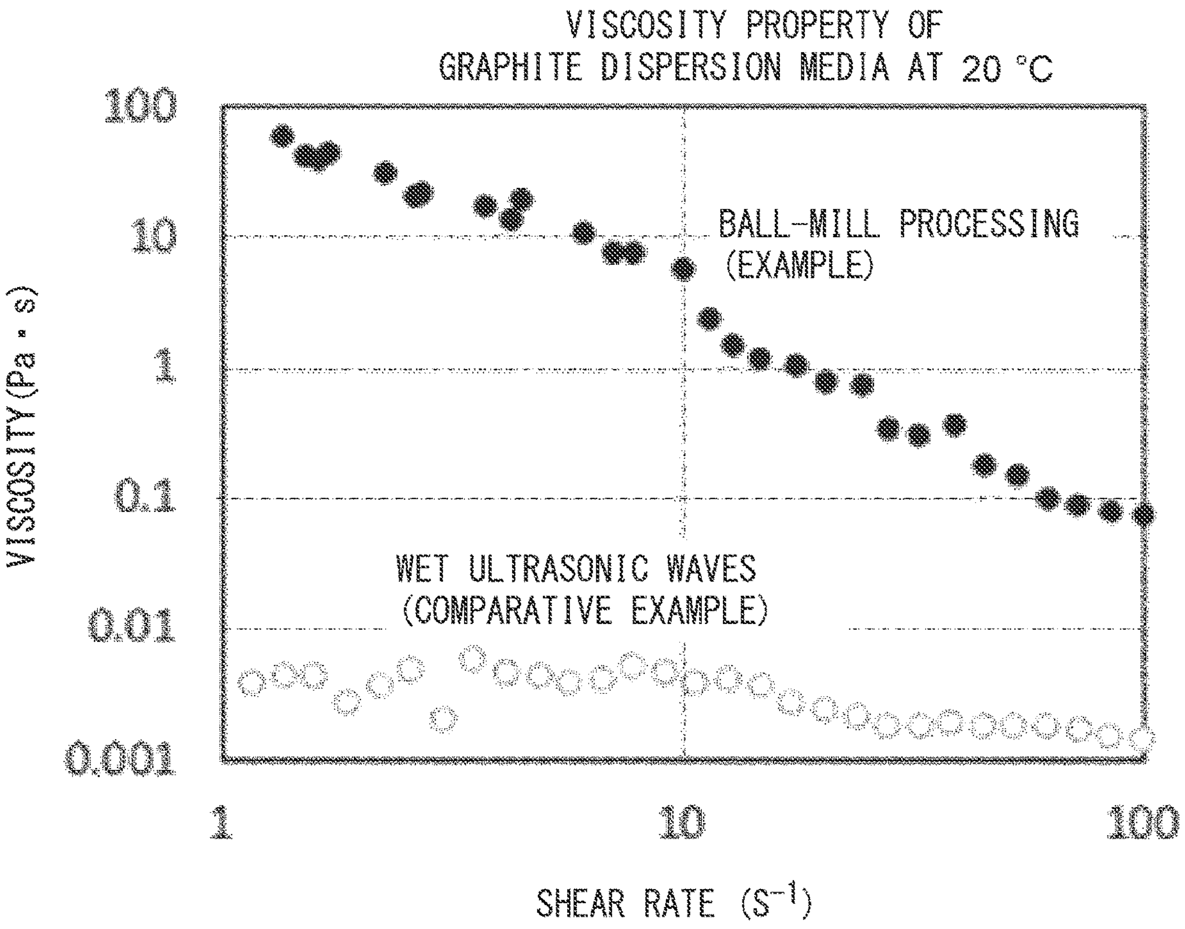
FIG. 18 is a graph plotting viscosity properties according to Example 2-22 and Comparative Example 2-12.

FIG. 18 shows the results of measuring the viscosity of the dispersion media of Example 2-22 and Comparative Example 2-12 at 20° C. Commonly, the viscosity of ethanol alone is 0.0012 Pa·s, but the viscosity of the inorganic particle composite obtained by wet ultrasonic waves is 0.004 Pa·s. On the other hand, the viscosity of the paste-like inorganic particle composite mixed by the ball mill was greatly dependent on the shear rate, and the viscosity became about 100 Pa·s when the shear rate was about 1 $s^{-1}$.

The present specification also discloses the invention of the following technical idea understood from the above embodiments.

Supplementary Note 1

A method for exfoliating a layered mineral powder into layers comprising:

adding a layered mineral powder and salt dispersed in an organic solvent to the organic solvent; and stirring an obtained mixture, wherein the organic solvent satisfies the following Formulas (1) and (2), and the salt has an acid dissociation constant pKa ($H_2O$) of an acid of a counter anion of the salt greater than 0.

4≤volume ratio of organic solvent 1×relative permittivity of organic solvent 1+ . . . +volume ratio of organic solvent $n$−1×relative permittivity of organic solvent $n$−1≤60 Formula (1)

In this formula, n is an integer of 1 or more, n=1 represents a single solvent, and n≥2 represents a mixed solvent.

Volume ratio of organic solvent 1×boiling point of organic solvent 1+ . . . +volume ratio of organic solvent $n$−1×boiling point of organic solvent n−1<100° C.

In this formula, n is an integer of 1 or more, n=1 represents a single solvent, and n≥2 represents a mixed solvent.

According to the method for exfoliating a layered mineral powder, exfoliation can be performed simply and in a short time, thereby improving the productivity. Further, the dispersibility can be remarkably enhanced by adding salt.

Supplementary Note 2

A method for producing a layered nanoplate composite comprising:

adding a layered mineral powder and salt dispersed in an organic solvent to the organic solvent; and stirring an obtained mixture, wherein the organic solvent satisfies the following Formulas (1) and (2), and the salt has an acid dissociation constant pKa ($H_2O$) of an acid of a counter anion of the salt greater than 0.

4≤volume ratio of organic solvent 1×relative permittivity of organic solvent 1+ . . . +volume ratio of organic solvent $n$−1×relative permittivity of organic solvent $n$−1≤60 Formula (1)

In this formula, n is an integer of 1 or more, n=1 represents a single solvent, and n≥2 represents a mixed solvent.

Volume ratio of organic solvent 1×boiling point of organic solvent 1+ . . . +volume ratio of organic solvent $n$−1×boiling point of organic solvent $n$−1≤100° C. Formula (2)

In this formula, n is an integer of 1 or more, n=1 represents a single solvent, and n≥2 represents a mixed solvent.

According to the above method for producing a layered nanoplate composite, it is possible to remarkably enhance the dispersibility by adding the salt to the organic solvent. Since this reaction can be carried out at room temperature and normal pressure, and dispersibility can be enhanced in a short time, productivity is excellent.

Supplementary Note 3

The method according to the Supplementary note 2, further comprising:

filtering by filtering a residue after the mixing; and redispersing the layered nanoplate composite in a solvent after the filtering to fractionate a size of the layered nanoplate composite.

According to the above method, a layered nanoplate composite having uniform size and excellent dispersibility can be easily obtained.

Supplementary Note 4

The method according to Supplementary note 2 or 3, further comprising:

distilling off the organic solvent after the filtering.

According to the above method, a layered nanoplate composite can be easily obtained.

Supplementary Note 5

The method according to any of Supplementary notes 2 to 4, wherein the layered mineral powder is thinned by the mixing.

INDUSTRIAL APPLICABILITY

Examples of applications of the layered nanoplate composite according to the present disclosure include ink, functional coating film, carrier for electrode catalyst, conductive composite, electronic components such as electrodes, and various sensors. The layered nanoplate composite according to the present disclosure is also expected to be widely applied to building materials, paints, and medical equipment.

Examples of applications of the inorganic particle composite according to the present disclosure include ink, functional coating film, carrier for electrode catalyst, conductive composite, electronic components such as electrodes, and various sensors. The inorganic particle composite according to the present disclosure is also expected to be widely applied to building materials, paints, and medical equipment. A resin or the like may be added to the dispersion to be used as a paste material. Alternatively, the nano-graphene may be formed into a sheet and the sheet may be used as a transparent conductive film.

This application claims priority to Japanese Patent Application No. 2017-198450, filed on Oct. 12, 2017 and Japanese Patent Application No. 2018-033385, filed on Feb. 27, 2018, the entire disclosure of which is incorporated herein.

The invention claimed is:

1. A method for producing an inorganic particle composite comprising:

(A) adding water-soluble salt to an inorganic powder and mixing the water-soluble salt and the inorganic powder in a dry or paste form;

(B) generating free radicals on a surface of the inorganic powder by mixing the water-soluble salt with the inorganic powder to form a mixture;

(C) reacting the free radicals generated on the surface of the inorganic powder with the counter-anion of the water-soluble salt; and (D) washing the mixture with water after (C) to obtain an inorganic particle composite including the component derived from the water-soluble salt, wherein:

the water-soluble salt is a weak acid salt that has an acid dissociation constant pKa ($H_2O$) of an acid of a counter anion of the water-soluble salt greater than 0, the inorganic powder is at least one of a layered mineral powder, an $sp^2$ type carbon material, a metal powder, a ceramic, and oxide powder of a layered mineral powder, an $sp^2$ type carbon material, a metal powder, or a ceramic, the free radicals are mutually bonded to the counter anion of the water-soluble salt, the anion derived from the water-soluble salt is bonded to the inorganic powder and the inorganic powder is negatively charged, and the cation derived from the water-soluble salt is attracted around the anion of the negatively charged inorganic powder forming an electric double layer of the cations and the anions, the counter-anion derived from the water-soluble salt in the inorganic particle composite is the cation of the water-soluble salt bonded to the inorganic powder by the weak acid releasing reaction between the free radicals generated on the surface of the inorganic powder and the weak acid, and the concentration of the cation component of the water soluble salt is 35 to 10,000 ppm.

2. The method according to claim 1, wherein the counter cation of the water-soluble salt is any of potassium ion, sodium ion, lithium ion, barium ion, calcium ion, magnesium ion, rubidium ion, and ammonium ion.

3. The method according to claim 1, wherein an average particle diameter of the inorganic particle composite when the inorganic particle composite is dispersed in a polar solvent is 1000 nm or less.

4. The method according to claim 1, wherein the inorganic powder is any of boron nitride, molybdenum disulfide, natural graphite, artificial graphite, expanded graphite, amorphous graphite, platy graphite, graphene nanoplate, graphene, tungsten disulfide and carbon nanotubes.

5. The method according to claim 2, wherein an average particle diameter of the inorganic particle composite when the inorganic particle composite is dispersed in a polar solvent is 1000 nm or less.

6. An inorganic particle composite comprising components of an inorganic powder and a water-soluble salt, and an electric double layer on the surface of the inorganic powder, wherein:

the water-soluble salt is a weak acid salt that has an acid dissociation constant pKa ($H_2O$) of an acid of a counter anion of the water-soluble salt greater than 0, and the inorganic powder is at least one of a layered mineral powder, an $sp^2$ type carbon material, a metal powder, a ceramic, and oxide powder of a layered mineral powder, an $sp^2$ type carbon material, a metal powder, or a ceramic, wherein:

the inorganic particle composite is obtained by mixing the water-soluble salt with the inorganic powder in a dry or paste form generating free radicals on a surface of the inorganic powder reacting the free radicals generated on the surface of the inorganic powder with the counter-anion of the water-soluble salt, bonding of the ions of the water soluble salt to a surface of the inorganic powder, and washing the inorganic powder to remove excess water-soluble salt, wherein:

upon dispersing the inorganic particle composite in a polar solvent, the water-soluble salt is ionized, wherein:

the anion derived from the water-soluble salt is bonded to the inorganic powder and the inorganic powder is negatively charged, and the cation derived from the water-soluble salt is attracted around the negatively charged inorganic powder forming the electric double layer of the cations and the anions, the concentration of the cation component of the water soluble salt is 35 to 10,000 ppm, and the counter-anion derived from the water-soluble salt in the inorganic particle composite is the cation of the water-soluble salt bonded to the inorganic powder by the weak acid releasing reaction between the free radicals generated on the surface of the inorganic powder and the weak acid, and an amount of the water-soluble salt to be added is 0.01 to 100 parts by mass per 1 part by mass of the inorganic powder.

7. The inorganic particle composite according to claim 6, wherein the counter cation of the water-soluble salt is any of a potassium ion, a sodium ion, a lithium ion, a barium ion, a calcium ion, a magnesium ion, a rubidium ion, and an ammonium ion.

8. The inorganic particle composite according to claim 6, wherein an average particle diameter when the inorganic particle composite is dispersed in a polar solvent is 1000 nm or less.

9. An inorganic particle composite dispersion comprising the inorganic particle composite according to claim 6 dispersed in a solvent.

10. The inorganic particle composite according to claim 6, wherein the inorganic powder is any of boron nitride, molybdenum disulfide, natural graphite, artificial graphite, expanded graphite, amorphous graphite, platy graphite, graphene nanoplate, graphene, tungsten disulfide and carbon nanotubes.

11. The inorganic particle composite according to claim 6, wherein the inorganic powder is layered.

* * * * *